(12) United States Patent
Urrutia et al.

(10) Patent No.: US 9,723,588 B1
(45) Date of Patent: Aug. 1, 2017

(54) DETERMINING A LOCATION OF A WIRELESS TRANSMITTER

(71) Applicant: Google Inc., Mountain View, CA (US)

(72) Inventors: Carlos Urrutia, San Jose, CA (US); Guanghua Li, San Jose, CA (US); Jun Yin, Fremont, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 15/082,612

(22) Filed: Mar. 28, 2016

(51) Int. Cl.
  *H04B 17/00* (2015.01)
  *H04W 64/00* (2009.01)
  *H04W 16/28* (2009.01)
  *H04W 48/08* (2009.01)
  *H04W 88/10* (2009.01)

(52) U.S. Cl.
  CPC ......... *H04W 64/006* (2013.01); *H04W 16/28* (2013.01); *H04W 48/08* (2013.01); *H04W 88/10* (2013.01)

(58) Field of Classification Search
  CPC .......................... G01S 5/0252; H04W 64/00
  USPC ........ 455/69, 522, 456, 404.2, 456.1, 562.1, 455/575.7, 456.5, 41.2, 67.11, 456.2, 455/226.2; 342/458, 453, 450, 457, 463, 342/368, 417; 726/22; 375/267, 200; 370/328; 702/150; 700/245; 340/686.6, 340/6.1
  See application file for complete search history.

(56) References Cited

U.S. PATENT DOCUMENTS

| | | | |
|---|---|---|---|
| 6,388,618 B1 * | 5/2002 | Stilp | G01S 5/02 342/457 |
| 6,515,624 B1 * | 2/2003 | Roesler | G01S 1/024 342/453 |
| 6,990,428 B1 * | 1/2006 | Kaiser | G01S 5/14 342/450 |
| 7,751,827 B2 * | 7/2010 | Poykko | G01S 5/0252 455/456.1 |
| 8,138,975 B2 | 3/2012 | Bull et al. | |
| 8,670,802 B2 * | 3/2014 | Antolovic | G01S 3/18 455/562.1 |
| 8,675,781 B2 | 3/2014 | Adnani et al. | |

(Continued)

FOREIGN PATENT DOCUMENTS

EP  1131649 B1  11/2006

*Primary Examiner* — Tan H Trinh

(74) *Attorney, Agent, or Firm* — Honigman Miller Schwartz and Cohn LLP

(57) ABSTRACT

A method for determining a location of a wireless transmitter includes: receiving, at data processing hardware, receiver signals from corresponding receivers located within an observation area; estimating, by the data processing hardware, the location of the rogue transmitter; and reporting the estimated location of the rogue transmitter to a remote system in communication with the data processing hardware. Estimating the location of a rogue transmitter includes, for each receiver, determining a transmitter location contour about the receiver based on the corresponding at least one receiver signal and one or more propagation path loss functions and identifying an intersection of the transmitter location contours of the receivers as the estimated location of the rogue transmitter. Each propagation path loss function is based on terrain information corresponding to the observation area. The transmitter location contour defines a collection of candidate locations of the rogue transmitter relative to the receiver.

24 Claims, 21 Drawing Sheets

(56) References Cited

U.S. PATENT DOCUMENTS

| | | | |
|---|---|---|---|
| 9,121,923 B2 | 9/2015 | Bull et al. | |
| 9,197,260 B2 | 11/2015 | Adnani et al. | |
| 2001/0022558 A1* | 9/2001 | Karr, Jr. | G01S 1/026 342/450 |
| 2002/0097182 A1* | 7/2002 | Goren | G01S 1/026 342/357.4 |
| 2004/0258012 A1* | 12/2004 | Ishii | H04L 47/10 370/328 |
| 2006/0019679 A1* | 1/2006 | Rappaport | H04W 64/00 455/456.5 |
| 2006/0281473 A1* | 12/2006 | Debany | G01S 5/14 455/456.2 |
| 2007/0087763 A1* | 4/2007 | Budampati | H04W 12/06 455/456.5 |
| 2008/0311871 A1* | 12/2008 | Qi | H04B 17/309 455/226.2 |
| 2009/0247186 A1* | 10/2009 | Ji | G01S 5/02 455/456.1 |
| 2010/0142458 A1* | 6/2010 | Mark | H04W 52/143 370/329 |
| 2010/0305752 A1* | 12/2010 | Abramson | G01S 1/70 700/245 |
| 2010/0330919 A1* | 12/2010 | Gurney | H04W 52/367 455/67.11 |
| 2011/0018766 A1* | 1/2011 | Steer | G01S 1/14 342/368 |
| 2012/0032854 A1* | 2/2012 | Bull | G01S 5/0215 342/450 |
| 2012/0154213 A1 | 6/2012 | Bull et al. | |
| 2012/0167207 A1* | 6/2012 | Beckley | H04W 4/001 726/22 |
| 2012/0328037 A1* | 12/2012 | Hsu | G01S 1/725 375/267 |
| 2013/0023286 A1* | 1/2013 | Soma | H04W 4/02 455/456.1 |
| 2013/0064328 A1 | 3/2013 | Adnani et al. | |
| 2013/0076523 A1* | 3/2013 | Kwan | A61B 5/0022 340/686.6 |
| 2013/0278465 A1* | 10/2013 | Owen | G01S 1/02 342/458 |
| 2014/0211890 A1 | 7/2014 | Adnani et al. | |
| 2014/0266912 A1* | 9/2014 | Sendonaris | G01S 11/04 342/458 |
| 2014/0378079 A1 | 12/2014 | Adnani et al. | |
| 2015/0247915 A1* | 9/2015 | Huang | G01S 5/0273 455/456.1 |
| 2015/0288399 A1* | 10/2015 | Pratt | H04B 1/123 455/296 |
| 2016/0286519 A1* | 9/2016 | Tzur | H04W 64/00 |

* cited by examiner

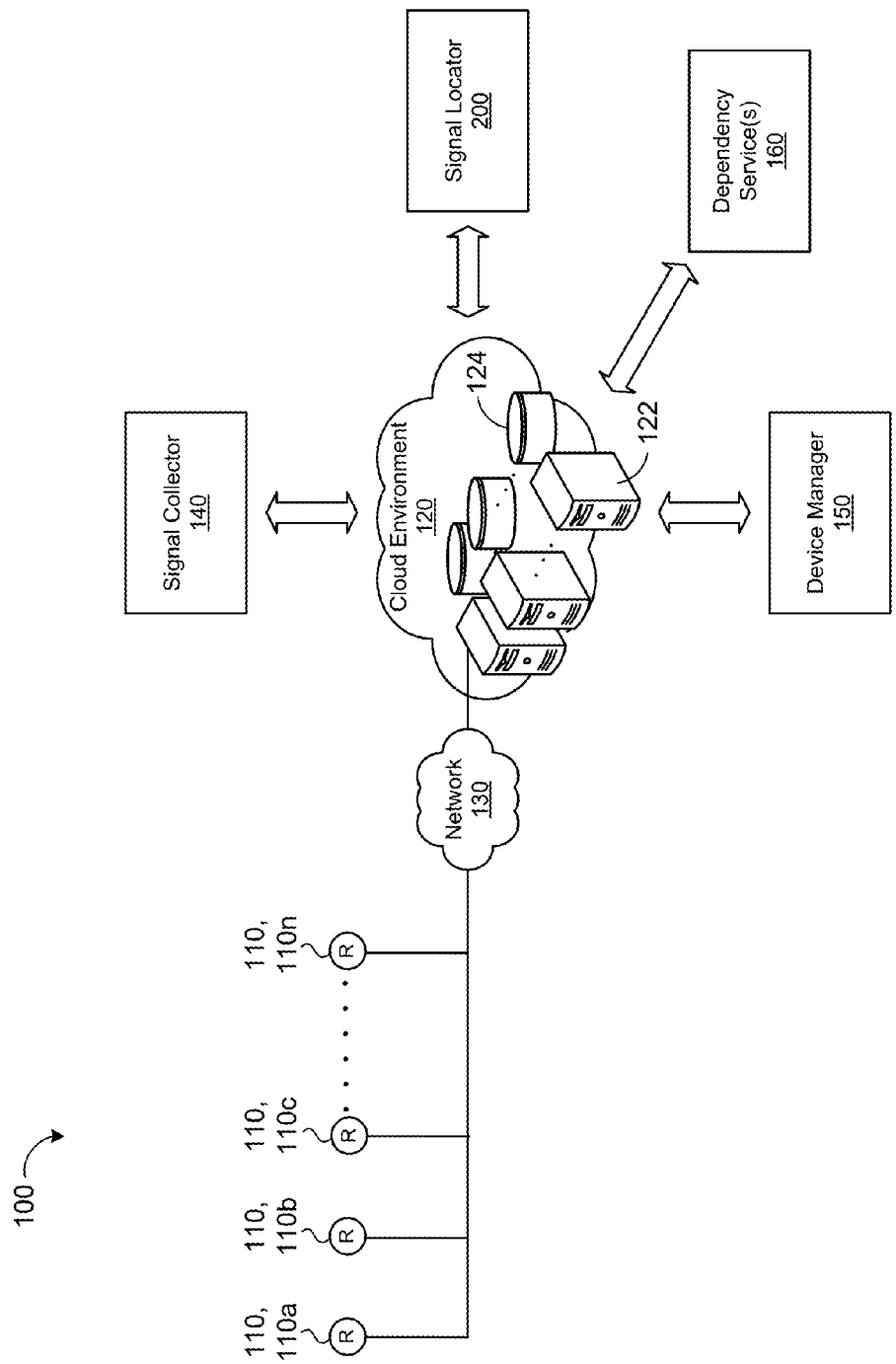

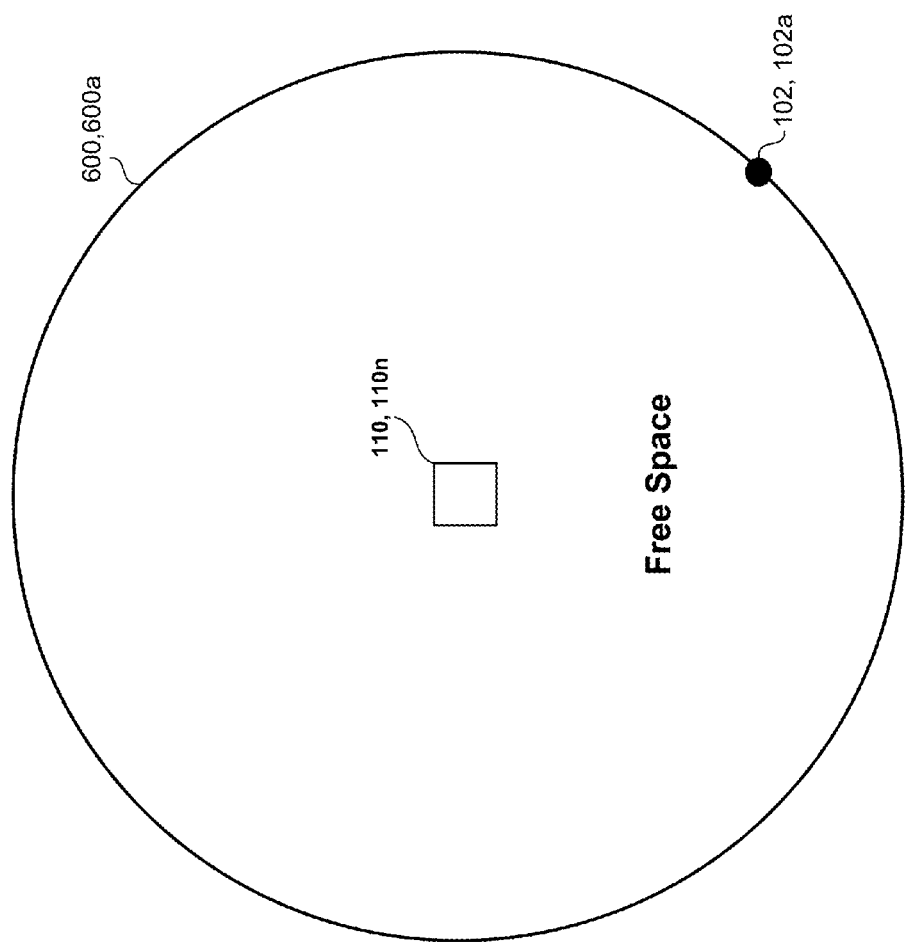

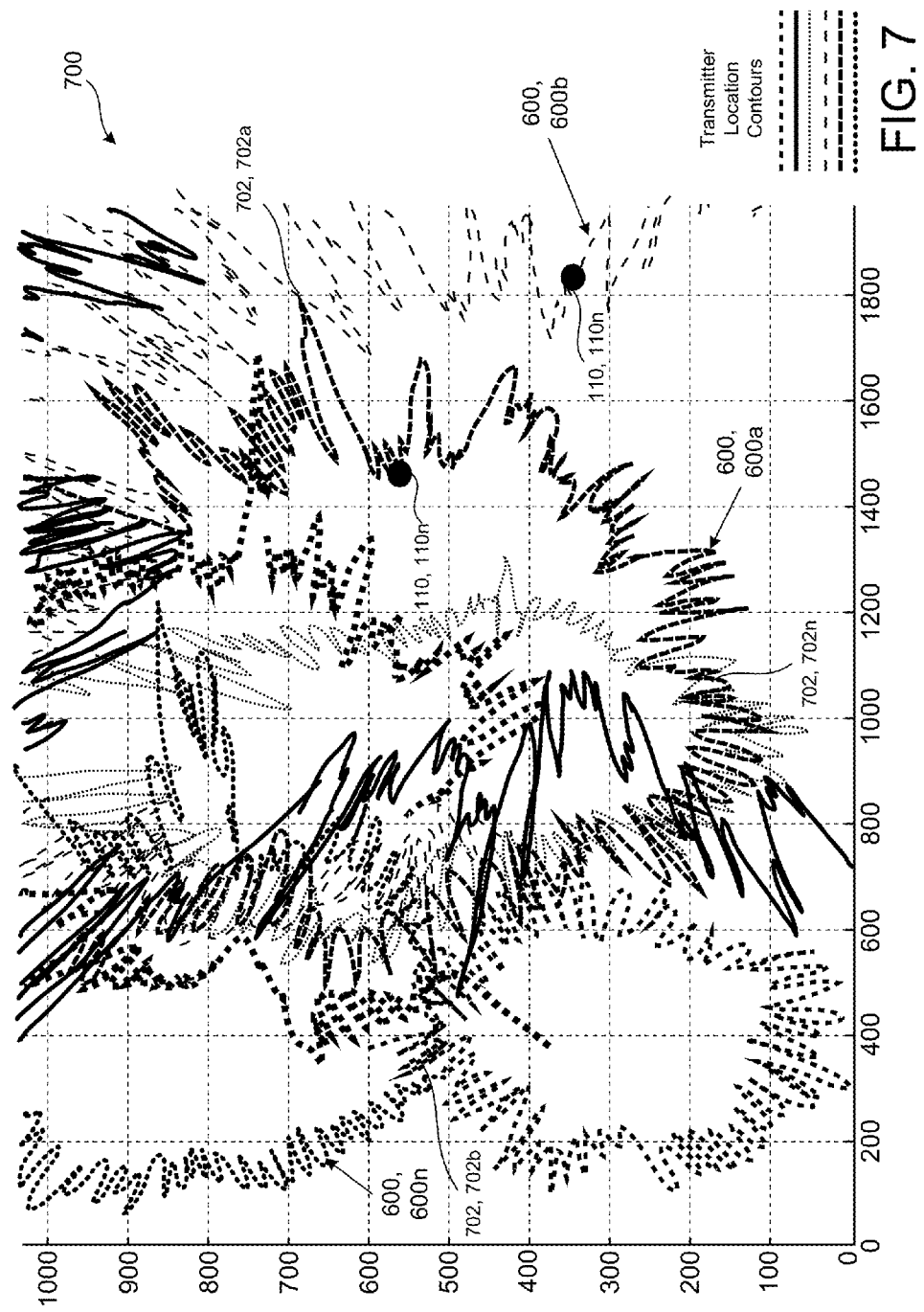

DETERMINING A LOCATION OF A WIRELESS TRANSMITTER

TECHNICAL FIELD

This disclosure relates to determining a location of a wireless transmitter using one or more sensors.

BACKGROUND

In general, telecommunication is when two or more entities or units exchange information (i.e., communicate) using technology such as transmitters and receivers. Channels are used to transmit the information either over a wired medium (e.g., signal cables) in the form of electromagnetic signals or a wireless medium (e.g., spectrum) in the form of electromagnetic waves, or a combination of the two. A communication network generally includes transmitters, receivers, and communication channels that transmit the signals from the transmitters to the receivers. Digital communication networks may also include routers that route a message to the correct receiver (e.g., user). Analog communication networks may also include switches that form a connection between two users. Both digital and analog communication networks may include repeaters used to amplify or recreate a signal transmitted over a long distance. The repeaters are usually used to counteract the attenuation (e.g., power loss) that the signal experiences as it is being transmitted.

SUMMARY

One aspect of the disclosure provides a method for determining a location of a wireless transmitter. The method includes: receiving, at data processing hardware, receiver signals from corresponding receivers located within an observation area; estimating, by the data processing hardware, the location of the rogue transmitter; and reporting the estimated location of the rogue transmitter to a remote system in communication with the data processing hardware. At least one of the receiver signals corresponds to a rogue signal transmitted from a rogue transmitter having a location in the observation area. Estimating the location of the rogue transmitter includes, for each receiver, determining a transmitter location contour about the receiver based on the corresponding at least one receiver signal and one or more propagation path loss functions and identifying an intersection of the transmitter location contours of the receivers as the estimated location of the rogue transmitter. Each propagation path loss function is based on terrain information corresponding to the observation area. The transmitter location contour defines a collection of candidate locations of the rogue transmitter relative to the receiver.

Implementations of the disclosure may include one or more of the following optional features. In some implementations, at least one transmitter location contour about the corresponding receiver is based on a receive power magnitude of the corresponding receiver signal. At least one rogue signal may be received by the corresponding receiver at a first time, and at least one transmitter location contour about the corresponding receiver may be based on the first time. At least one rogue signal may be received by the corresponding receiver at an angle relative to a reference direction, and at least one transmitter location contour about the corresponding receiver may be based on the angle.

In some examples, determining the transmitter location contour about the corresponding receiver may include determining, for each receiver, a plurality of propagation loss values from the propagation loss function based on (i) a location of the receiver and (ii) a plurality of guessed locations of the rogue transmitter. The method may also include creating a propagation loss matrix having the plurality of propagation loss values, a first of the plurality of first propagation loss values corresponding to a first of a plurality of guessed locations of the rogue transmitter, and a second of the plurality of propagation loss values corresponding a second of the plurality of guessed locations of the rogue transmitter.

The method may further include steering the receivers toward the estimated location of the rogue transmitter using beam forming. The terrain information may include locations of at least one of vegetation, buildings, and ground elevations within the observation area. A first of the receiver signals may be transmitted using a first transmission protocol, and a second of the receiver signals may be transmitted using a second transmission protocol different than the first transmission protocol. In some examples, the first transmission protocol is WiFi and the second transmission protocol is LTE. Each transmitter location contour may define a circumscribed path along the collection of candidate transmitter locations about the receiver.

Another aspect of the disclosure provides a system for determining a location of a wireless transmitter. The system includes data processing hardware and memory hardware in communication with the data processing hardware. The memory hardware stores instructions that when executed on the data processing hardware cause the data processing hardware to perform operations. The operations include: receiving receiver signals from corresponding receivers located within an observation area and in communication with the data processing hardware; determining a location of the rogue transmitter; identifying an intersection of the transmitter location contours of the receivers as the estimated location of the rogue transmitter; and reporting the estimated location of the rogue transmitter to a remote system in communication with the data processing hardware. Each receiver signal has a corresponding receive power level and corresponds to a rogue signal transmitted from a rogue transmitter located in the observation area. The location of the rogue transmitter is determined by, for each receiver, determining a transmitter location contour about the receiver based on the receive power level of the corresponding receiver signal and one or more propagation path loss functions. Each propagation path loss function is based on terrain information corresponding to the observation area. The transmitter location contour defines a collection of candidate locations of the rogue transmitter relative to the receiver.

This aspect may include one or more of the following optional features. In some implementations, at least one transmitter location contour about the corresponding receiver is based on a receive power magnitude of the corresponding receiver signal. At least one rogue signal may be received by the corresponding receiver at a first time, and at least one transmitter location contour about the corresponding receiver may be based on the first time. At least one rogue signal may be received by the corresponding receiver at an angle relative to a reference direction, and at least one transmitter location contour about the corresponding receiver may be based on the angle.

In some examples, the data processing hardware includes a transmitter location solver configured to determine, for each receiver, a plurality of propagation loss values from the propagation loss function based on (i) a location of the receiver and (ii) a plurality of guessed locations of the rogue transmitter. The system may also include a propagation matrix builder configured to create a propagation loss matrix having the plurality of propagation loss values, a first of the plurality of first propagation loss values corresponding to a first of a plurality of guessed locations of the rogue transmitter, a second of the plurality of propagation loss values corresponding a second of the plurality of guessed locations of the rogue transmitter.

In some examples, the data processing hardware steers the receivers toward the estimated location of the rogue transmitter using beam forming. The terrain information may include locations of at least one of vegetation, buildings, and ground elevations within the observation area. A first of the receiver signals may be transmitted using a first transmission protocol, and a second of the receiver signals may be transmitted using a second transmission protocol different than the first transmission protocol. The first transmission protocol may be WiFi and the second transmission protocol may be LTE. Each transmitter location contour may define a circumscribed path along the collection of candidate transmitter locations about the receiver.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 1B and 1C are functional block diagrams of the transmitter enforcement system.

FIG. 6A is a schematic view of an example transmitter location contour of a transmitter enforcement system.

FIG. 7 is a schematic view of a plurality of example transmitter location contours of a transmitter enforcement system.

Like reference symbols in the various drawings indicate like elements.

DETAILED DESCRIPTION

A wide range of industries utilize electromagnetic or wireless spectrum in order to facilitate communication from and between a variety of different devices and products. For example, a cellular phone may transmit and receive wireless signals across the wireless spectrum in order to communicate with another cellular phone. A device (e.g., a transmitter) transmitting signals across the wireless spectrum can also disrupt the transmission of signals between other, unrelated devices (e.g., other transmitters). In this regard, unauthorized use of the wireless spectrum by an entity or transmitter can create communication problems for other industries and other transmitters. Accordingly, regulating bodies, such as the Federal Communications Commission (FCC), restrict and regulate the use of the wireless spectrum through various means. For example, the FCC issues licenses to various frequency bands of the wireless spectrum in order to minimize the disruption of signals transmitted across the wireless spectrum. Moreover, prior to being used, transmitters must be approved by the FCC to ensure compliance with the issued licenses. By licensing bands of the wireless spectrum and requiring approval of wireless signal-transmitting device, the FCC is able to control the amount of wireless interference experienced by wireless spectrum users.

Various systems and methods, such as angle of arrival, time difference of arrival, and power of arrival, are used to determine the location of a transmitter. Angle of arrival uses the difference in the angles at which a signal is received by various receivers to determine the location of a transmitter. Time difference of arrival uses the difference in the time at which signals are received by various receivers to determine the location of a transmitter. Power of arrival uses the difference in the amount of power of a signal received by various receivers to determine the location of a transmitter. Improved systems and methods for detecting, locating, and reporting the location of, transmitters can prevent the disruption of wireless communications across the wireless spectrum.

Figure 1A:
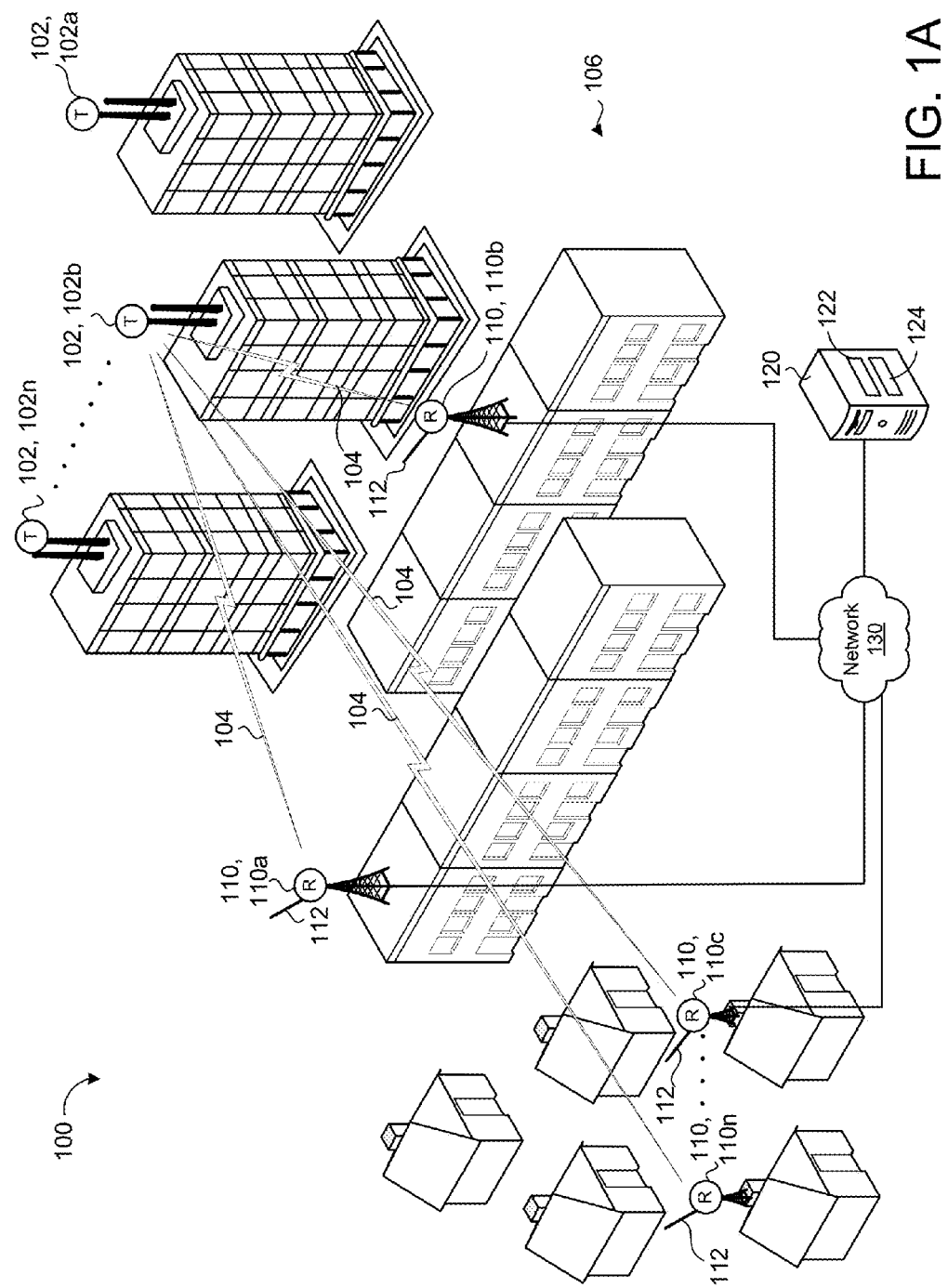
FIG. 1A is a schematic view of an example transmitter enforcement system.
Figure 1C:
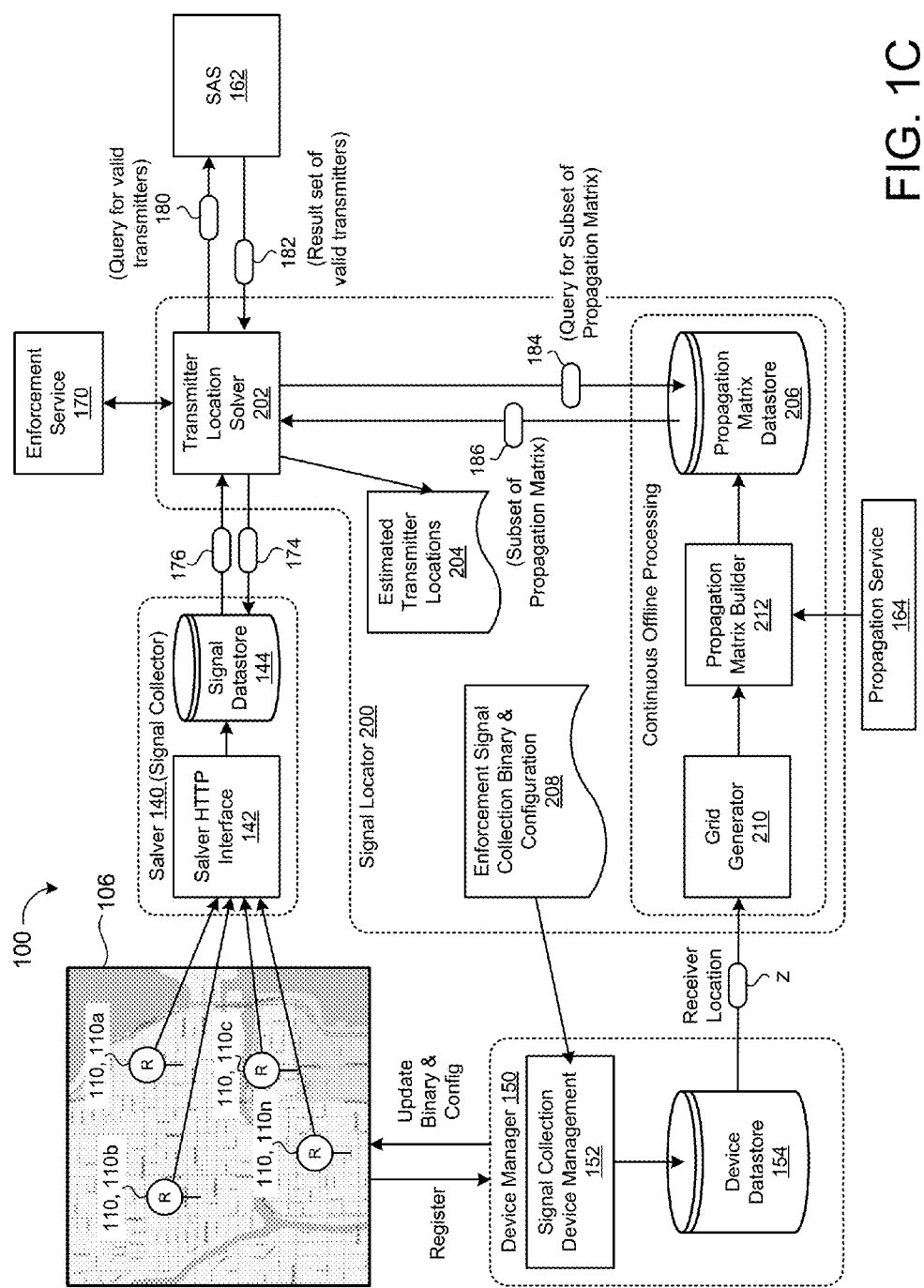

FIGS. 1A-1C illustrates an example transmitter enforcement system 100 for determining a location of transmitters 102, 102a-n transmitting signals 104 in an observation area 106. The signal 104 may include a variety of forms, such as WiFi, WiMAX, or long-term evolution, for example. The transmitters 102, 102a-n may include any number of compliant transmitters (e.g., 102a) and/or any number of rogue or rogue transmitters (e.g., 102b). In this regard, the signal 104 may be an authorized signal 104 (e.g., a signal transmitted from compliant transmitter 102a) or an unauthorized signal 104 (e.g., a signal transmitted from rogue transmitter 102b). In some implementations, one or more of the transmitters 102 (e.g., compliant transmitters 102a) may be disposed at known locations within the observation area 106, while one or more other transmitters 102 (e.g., the rogue transmitter 102b) may be disposed at unknown locations within the observation area 106.

The transmitter enforcement system 100 includes signal receivers 110, 110a-n (also referred to herein as receivers) in communication with a remote system 120 via a network 130. The remote system 120 includes data processing hardware 122 and optionally memory hardware 124. The receivers 110, 110a-n are located in different geographical locations in the observation area 106 and are configured to listen for the signal 104 of the transmitter 102.

Figure 2:
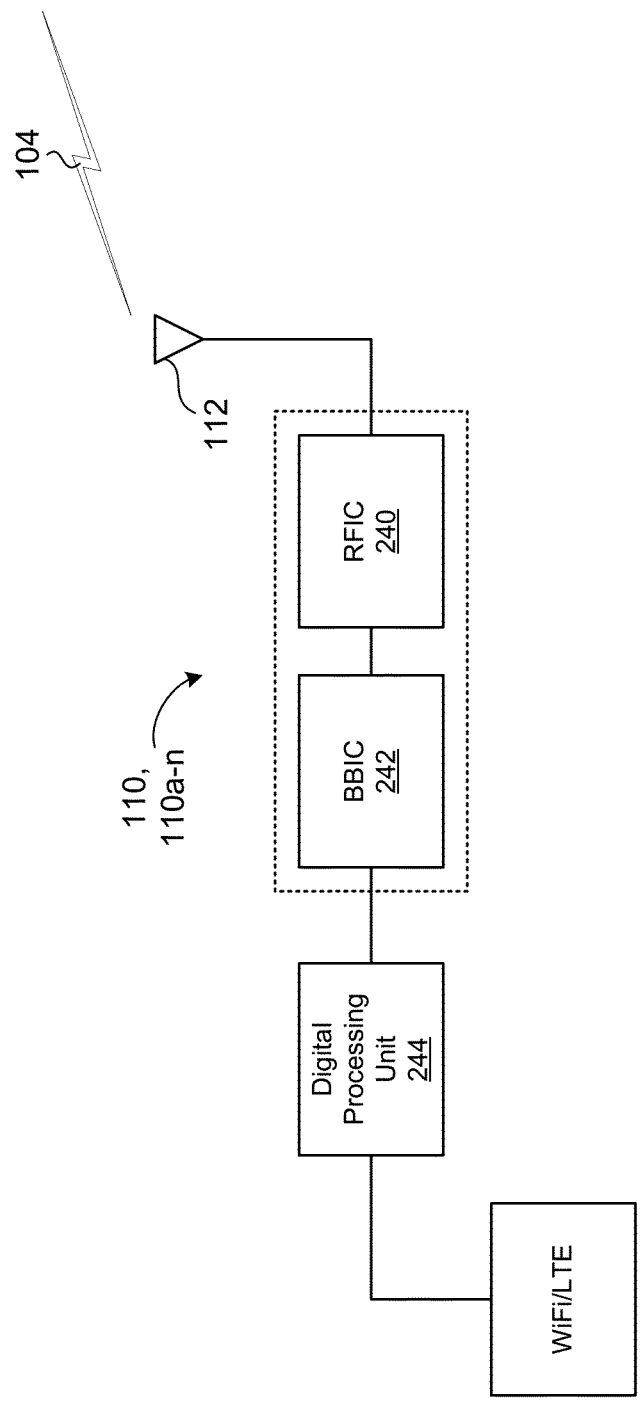
FIG. 2 is a schematic view of an example receiver of a transmitter enforcement system.

As shown in FIG. 2, each receiver 110, 110a-n may include an antenna 112 configured to receive signals (e.g., signal 104) from the transmitters 102. In some implementations, the antenna 112 may include a directional or steerable antenna, such as a phased array antenna. In this regard, the receiver 110 may receive the signal 104 when the antenna 112 is pointed in, or aligned with, a direction corresponding to the direction from which the signal 104 is being received. In some implementations, the antenna 112 is electronically steerable. For example, the direction in which the antenna 112 is pointed may be controlled by remotely steering and changing the position of the antenna 112.

In some implementations, one or more of the receivers 110 includes a Radio Frequency Integrated Circuit (RFIC) 240 driven by a Base Band Integrated circuit (BBIC) 242. The RFIC 240 is a chip that transmits and receives radio waves (e.g., signal 104). For example, each receiver 110 may include one or more RFIC chips 240 and a BBIC chip 242. The RFIC chip 240 may transmit and receive radio waves (e.g., signal 104). The BBIC chip 242, also known as a baseband radio processor, may manage radio functions (i.e., all functions that need an antenna) of the receiver 110. For example, the BBIC chip 242 may apply gain stages to an input signal, perform down conversion to baseband, and convert the input signal from an analog signal to a digital signal via an analog-to-digital (ADC) converter. A digital processing unit 244 that communicates with the BBIC chip 242 may be used for further processing of the digital signal.

In some examples, allowing multiple RFIC chips 240 to be driven from the same BBIC chip 242 allows for an increase in gain by the antenna 112 or diversity of the antenna 112. In other words, adding multiple RFIC chips 240 to a single BBIC chip 242 may allow for an increase in the array gain and link budget.

Referring again to FIGS. 1B and 1C provide functional block diagrams of the transmitter enforcement system 100. In the example shown in FIG. 1B, the remote system 120 is a distributed system (e.g., cloud environment) having scalable/elastic computing resources 122 and/or storage resources 124. The network 130 may include various types of networks, such as a local area network (LAN), wide area network (WAN), and/or the Internet. In some implementations, the transmitter enforcement system 100 includes a signal collector 140 and a device manager 150. The signal collector 140 and the device manager 150 may be in communication with the receivers 110, 110a-n. In some implementations, the signal collector 140 receives communications (e.g., periodic reports) from the receivers 110, 110a-n, providing listening information pertaining to any signals 104 transmitted from any transmitters 102 in the observation area 106. In particular, in some implementations, the signal collector 140 includes a signal collector interface 142 (e.g., an HTTP interface) and a signal datastore 144. The signal collector interface 142 may receive and record periodic reports from the receivers 110, 110a-n through the network 130. The periodic reports may include a power level (e.g., magnitude) of signals (e.g., signal 104) received by the receivers 110, 110a-n. The signal collector interface 142 may send a communication (e.g., the periodic reports) to the signal datastore 144, which stores the periodic reports for further processing.

The device manager 150 receives communications (e.g., registration information corresponding to the receivers 110, 110a-n) from the receivers 110, 110a-n, and sends communications to the remote system 120 through the network 130. For example, the device manager 150 receives identification information pertaining to the receivers 110, 110a-n and sends "update and binary configuration" information to the remote system 120. In some implementations, the device manager 150 includes a signal collection device management module 152 and a device datastore 154. The signal collection device management module 152 receives the identification information (e.g., registration number for the receivers 110, 110a-n) and may also change the status of (e.g., add, remove, enable, and disable) receivers 110, 110a-n within the observation area 106. The signal collection device management module 152 sends the identification information to the device datastore 154, which stores the identification information and status of the receivers 110, 110a-n for further processing. The signal collection device management module 152 may also send the "update and binary configuration" information to the remote system 120.

As illustrated in FIG. 1B, the transmitter enforcement system 100 includes a signal locator 200 in communication with the signal collector 140 and the device manager 150. The signal locator 200 is configured to determine or at least estimate a location of a transmitter 102 (e.g., a rogue transmitter 102b) located in the observation area 106. With reference to FIG. 1C, the transmitter enforcement system 100 may include dependency services 160, such as a spectrum access system (SAS) 162 and a propagation service 164, in communication with the signal locator 200.

The signal locator 200 may include a transmitter location module or solver 202, an estimated transmitter locations module 204, a propagation matrix datastore 206, a signal collection enforcement module 208, a grid generator 210, and a propagation matrix module 212. The transmitter location solver 202 may be in communication with the signal collector 140, the estimated transmitter locations module 204, the propagation matrix datastore 206, the dependency service(s) 160, and an enforcement service 170. In some implementations, the transmitter location solver 202 receives from the signal datastore 144 information pertaining to the signal 104 transmitted from the transmitters 102, 102a-n. For example, the transmitter location solver 202 may send information, such as queries 174, to the signal datastore 144, and the signal datastore may send corresponding information, such as periodic reports 176, to the transmitter location solver 202. The queries 174 may pertain to the periodic reports received from the receivers 110, 110a-n. For example, the queries 174 may pertain to a power loss function of a subset of the signals 104. The transmitter location solver 202 utilizes the information (e.g., the periodic reports) received from the signal datastore 144 to (i) determine or at least estimate a location of a transmitter 102 and (ii) send the determined or estimated location to the signal datastore 144 for storage therein.

The transmitter location solver 202 may also receive communications from the enforcement service 170. In some implementations, the enforcement service 170 sends information pertaining to a particular region of the observation area 106 in which the transmitters 102, 102a-n may be located. In this regard, the enforcement service 170 may maintain a database of regions of the observation area 106.

The transmitter location solver 202 may also receive communications from and send communications to the SAS 162. For example, the transmitter location solver 202 may send information, such as queries 180, to the SAS 162. The queries 180 may pertain to identifying locations of transmitters 102. In particular, the queries 180 may pertain to identifying locations of compliant transmitters 102a. The SAS 162 may send information, such as a result set 182 of transmitters 102, to the transmitter location solver 202. For example, in some implementations, the SAS 162 sends the result set 182 of compliant transmitters 102a to the transmitter location solver 202 in response to the query 180 received from the transmitter location solver 202.

The transmitter location solver 202 may also receive communications from and send communications to the propagation matrix datastore 206. For example, the transmitter location solver 202 may send information, such as queries 184, to the propagation matrix datastore 206. The queries 184 may pertain to an estimated propagation loss between one or more candidate locations of a transmitter 102, 102a-n and a known location of a receiver 110, 110a-n. Each query 184 may include a location of a receiver 110, a receive power R of the corresponding receiver 110, and a location of a transmitter 102. The location of the receiver 110 may include a known location of the particular receiver 110, while the location of the transmitter 102 may include a guessed or estimated location of the transmitter 102. In this regard, each successive query 184 may include the known location of the receiver 110 and a different guessed or estimated location (as compared to the previous guessed or estimate locations) of the transmitter 102.

The propagation matrix datastore 206 may send information, such as a subset 186 of a matrix of the propagation matrix datastore 206, to the transmitter location solver 202. In some implementations, the propagation matrix datastore 206 sends the subset 186 of a matrix to the transmitter location solver 202 in response to the query 184 received from the transmitter location solver 202.

The estimated transmitter locations module 204 may receive communications from the transmitter location solver 202. For example, in some implementations, the estimated transmitter locations module 204 receives estimated locations of the transmitters 102, 102a-n (e.g., rogue transmitter(s) 102b) from the transmitter location solver 202. In this regard, the transmitter location solver 202 estimates the location of the transmitters 102, 102a-n from (i) the subset 186 of the matrix, (ii) the result set 182 of valid transmitters 102, and (iii) the information received from the signal datastore 144.

The propagation service 164 may include various types of information utilized by the signal locator 200. For example, the propagation service 164 may include information pertaining to the terrain (e.g., topography, building locations, building sizes, vegetation locations, vegetation sizes, etc.) in the observation area 106. The propagation service 164 may use the terrain information to provide propagation loss functions for signals (e.g., signals 104) transmitted between two locations within the observation area 106. The signal locator 200 (e.g., the propagation matrix builder 212) may utilize the propagation loss functions to produce a propagation loss matrix associated with each receiver 110a-n located within the observation area 106. In this regard, as will be explained in more detail below, the signal locator 200 may communicate with the propagation service 164 in order to determine or at least estimate the location of a transmitter 102 located in the observation area 106.

When a signal 104 is transmitted or otherwise propagated wirelessly from a transmitter (e.g., non-compliant transmitter 102b and/or compliant transmitter 102a), power flows from the transmitter to the receiver 110. As the signal 104 propagates from the transmitter to the receiver 110, the signal may attenuate or otherwise lose intensity. In particular, the amount of power associated with the signal 104 may be reduced due to the terrain, buildings, or other power loss-causing objects located within the observation area 106. For example, a signal 104 transmitted from the transmitter 102 may include a transmit power P1 upon transmission from the transmitter 102, and a receive power P2 upon receipt by the receiver 110. In this regard, the signal 104 may experience a loss of power $L_P$ during propagation from the transmitter 102 to a particular one of the receivers 110. The loss of power $L_P$ can be represented by the following formula:

$$L_P = L(f, u_T, u_R, \gamma_T, \gamma_R) \qquad (1)$$

where f is the frequency of the transmitted signal 104, $u_T$ is the location of the transmitter 102, $u_R$ is the location of the receiver 110, $\gamma_T$ is the antenna pattern of the transmitter 102, and $\gamma_R$ is the antenna pattern of the receiver 110.

If the location $u_R$ and antenna pattern $\gamma_R$ of the receiver 110 are known, then at a known frequency f of the transmitted signal 104 the loss of power $L_P$ for a receiver p can be represented as:

$$L_p(x, \gamma) \qquad (2)$$

where x is the location of the transmitter 102 and $\gamma$ is the antenna pattern of the transmitter 102.

In an observation area 106 having a quantity S of transmitters 102, 102n and a quantity N of receivers 110, 110n, the relationship between (i) the transmit power $P_S$, in decibel-milliwatts (i.e., dBm) of the signal 104 upon transmission by a transmitter 102 and (ii) the receive power $R_N$, in dBm, of the signal 104 upon reception by a receiver 110 can be expressed as:

$$10^{P_1/10} \cdot 10^{-L_1(x_1,\gamma_1)/10} + \ldots + 10^{P_S/10} \cdot 10^{-L_1(x_S,\gamma_S)/10} = 10^{R_1/10}$$

.
.
.

$$10^{P_1/10} \cdot 10^{-L_N(x_1,\gamma_1)/10} + \ldots + 10^{P_S/10} \cdot 10^{-L_N(x_S,\gamma_S)/10} = 10^{R_N/10} \qquad (3)$$

Figure 3A:
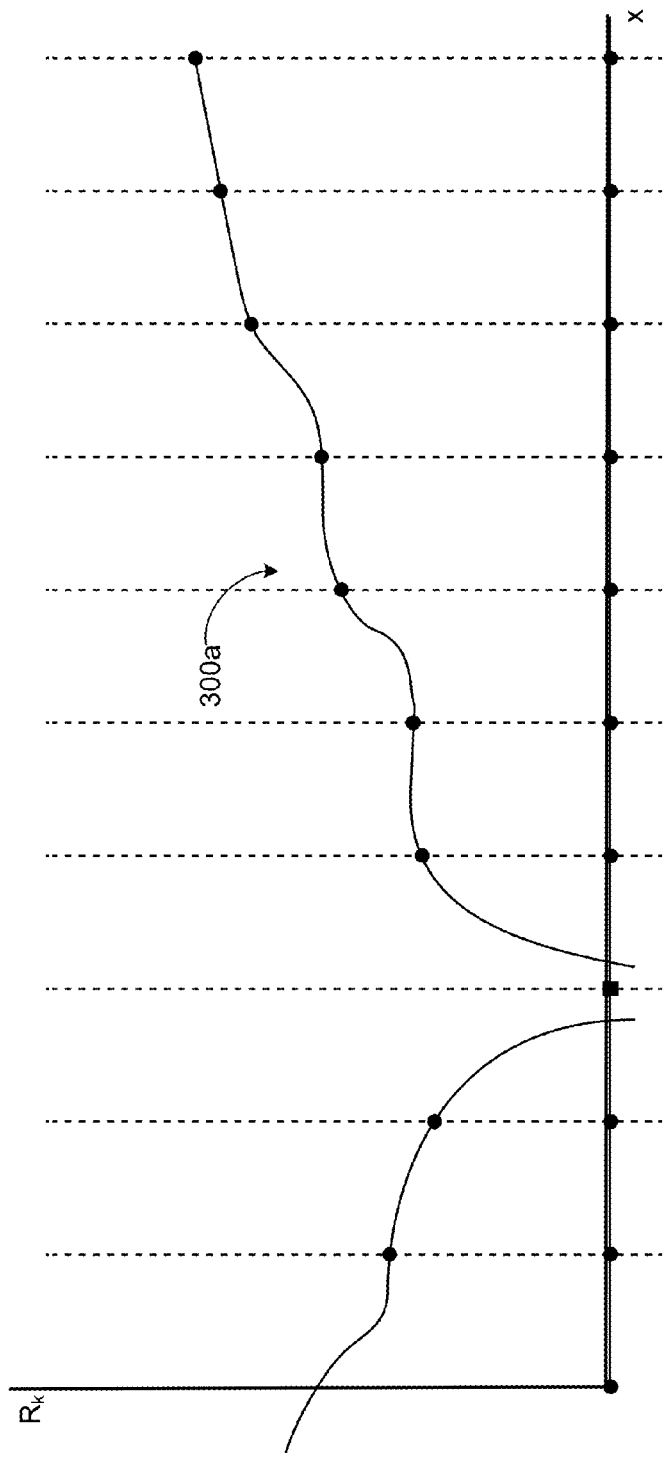
FIG. 3A is an example sample path loss function for a receiver of a transmitter enforcement system.
Figure 3B:
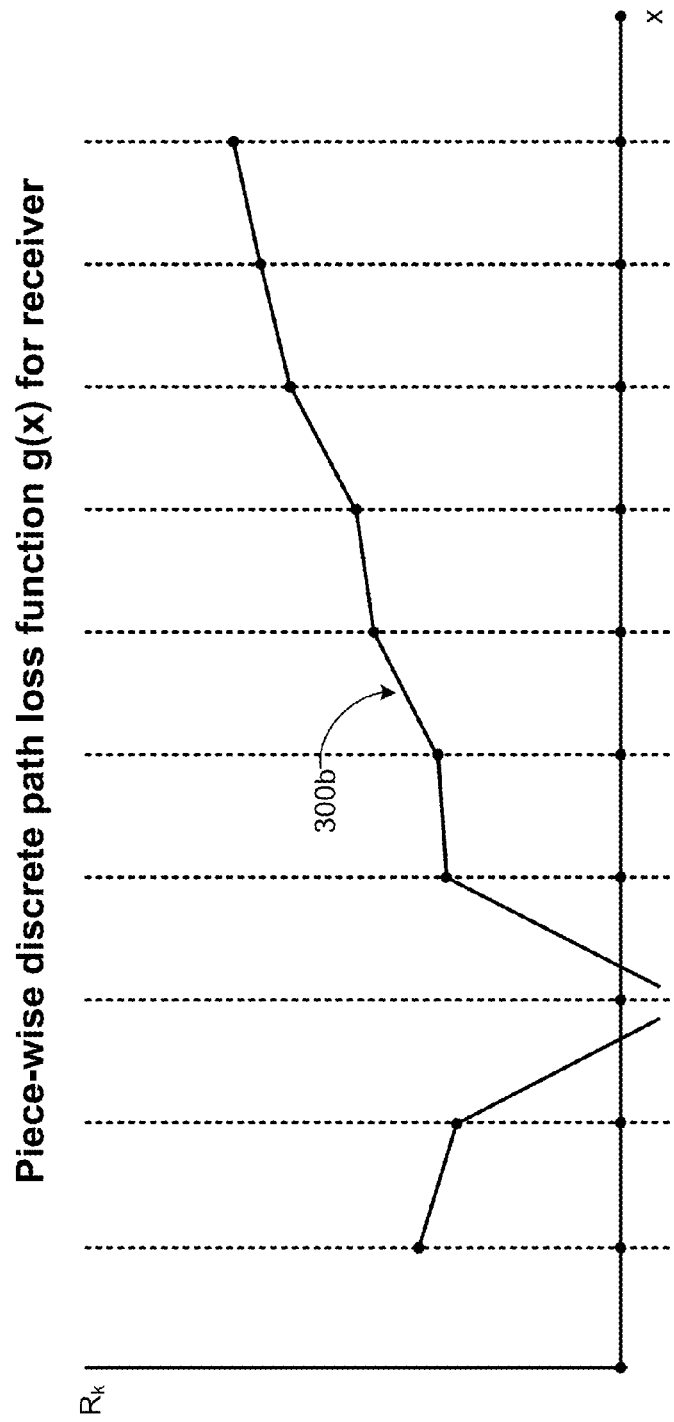
FIG. 3B is an example piece-wise, discretized path loss function for a receiver of a transmitter enforcement system.
Figure 4:
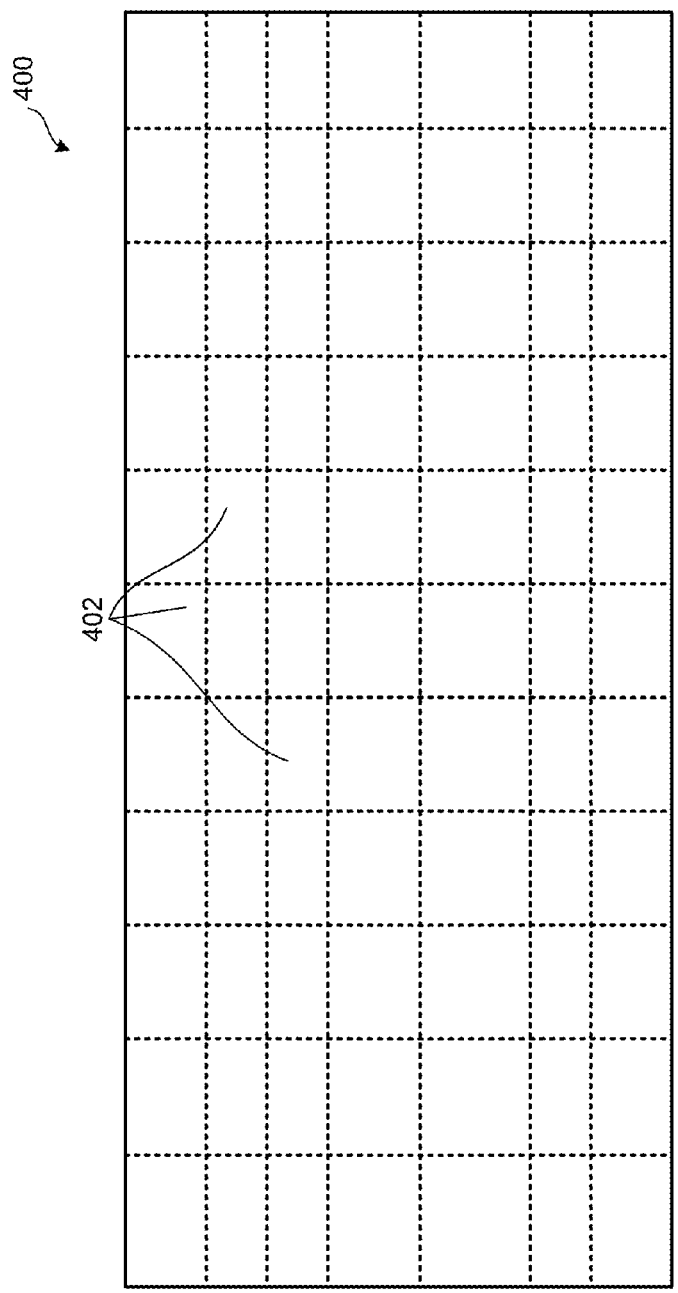
FIG. 4 is an example discretized observation area of a transmitter enforcement system.
Figure 5A:
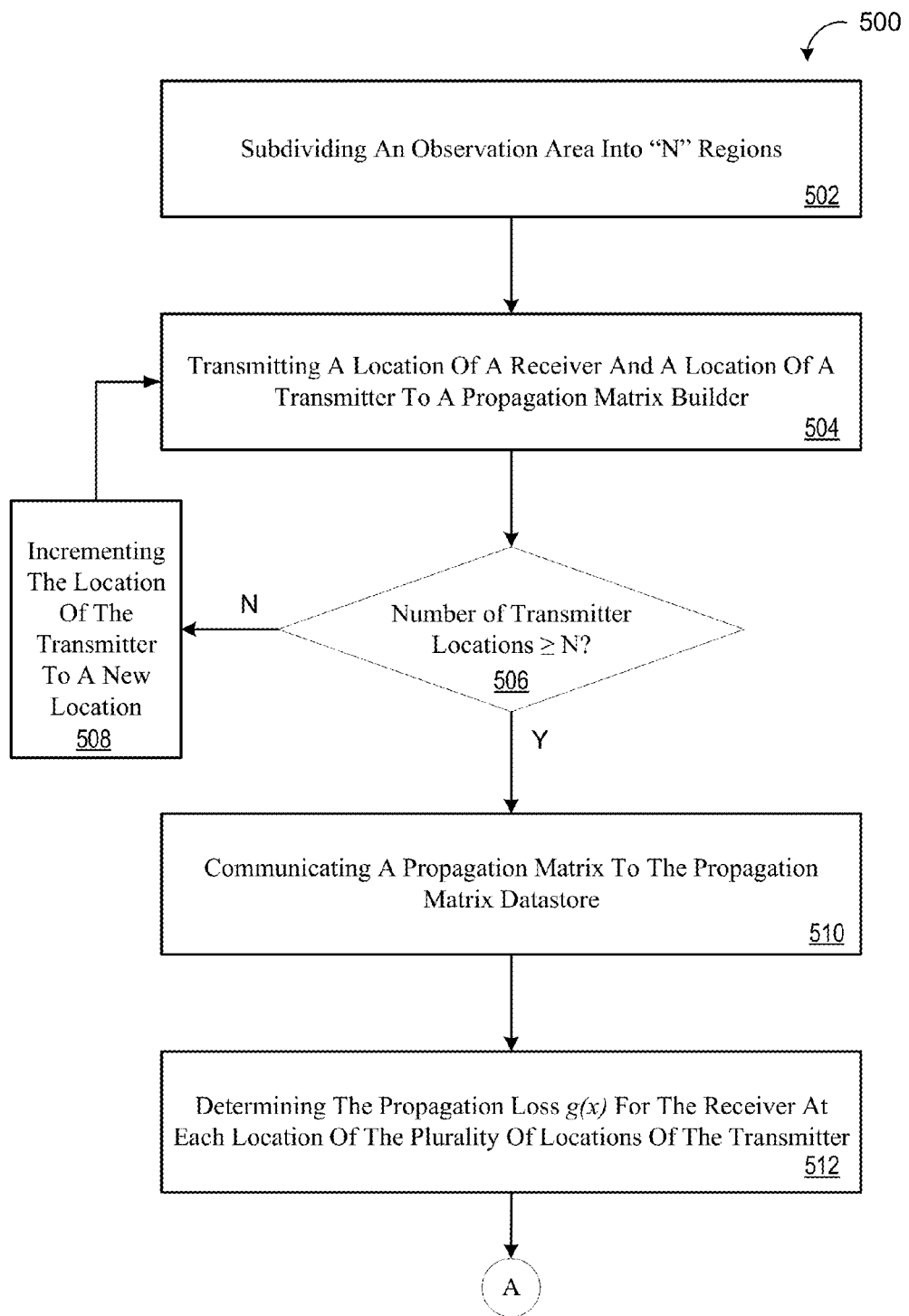
FIGS. 5A-5D collectively provides a flowchart illustrating an example method according to principles of the present disclosure.
Figure 5B:
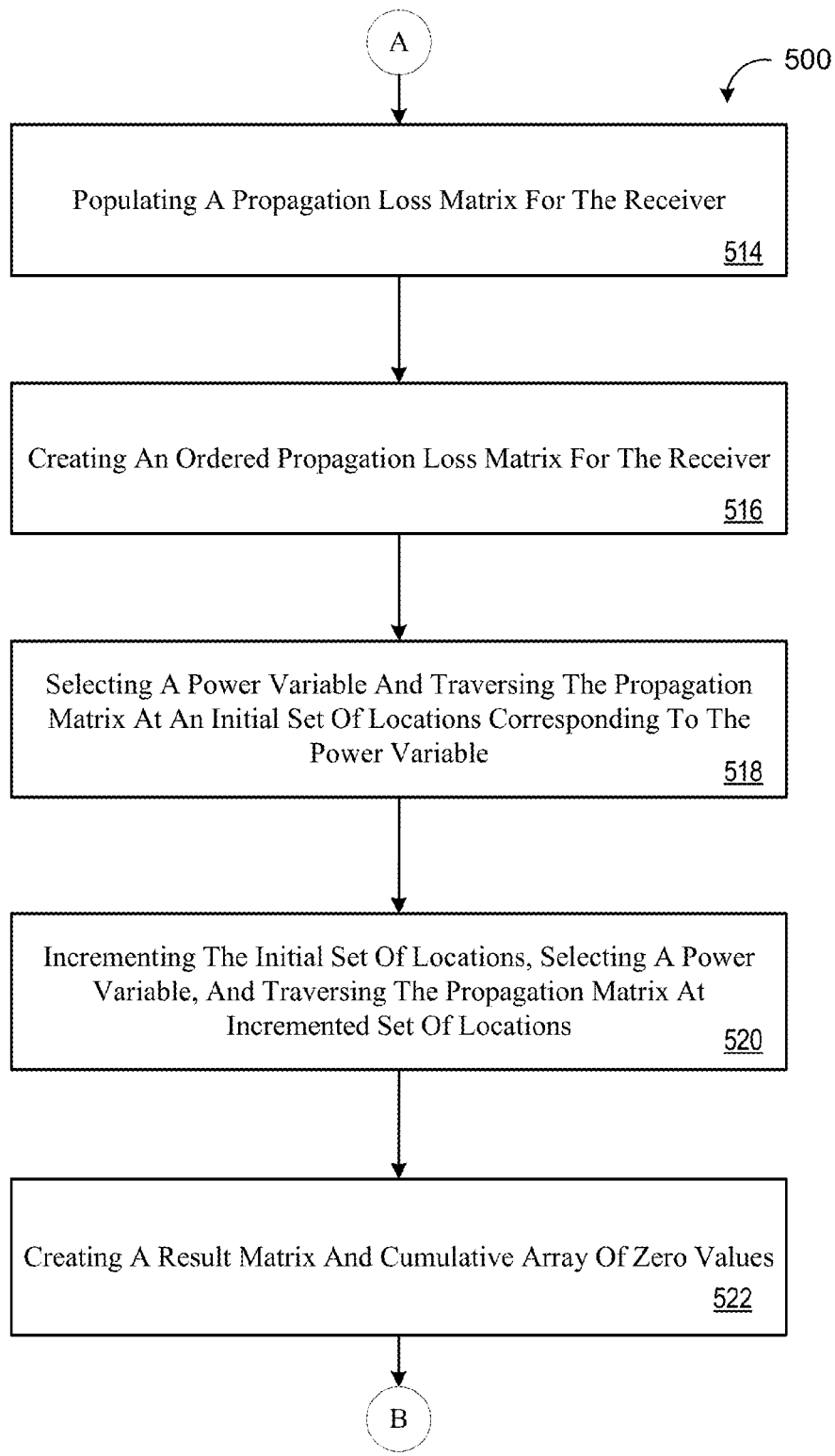
Figure 5C:
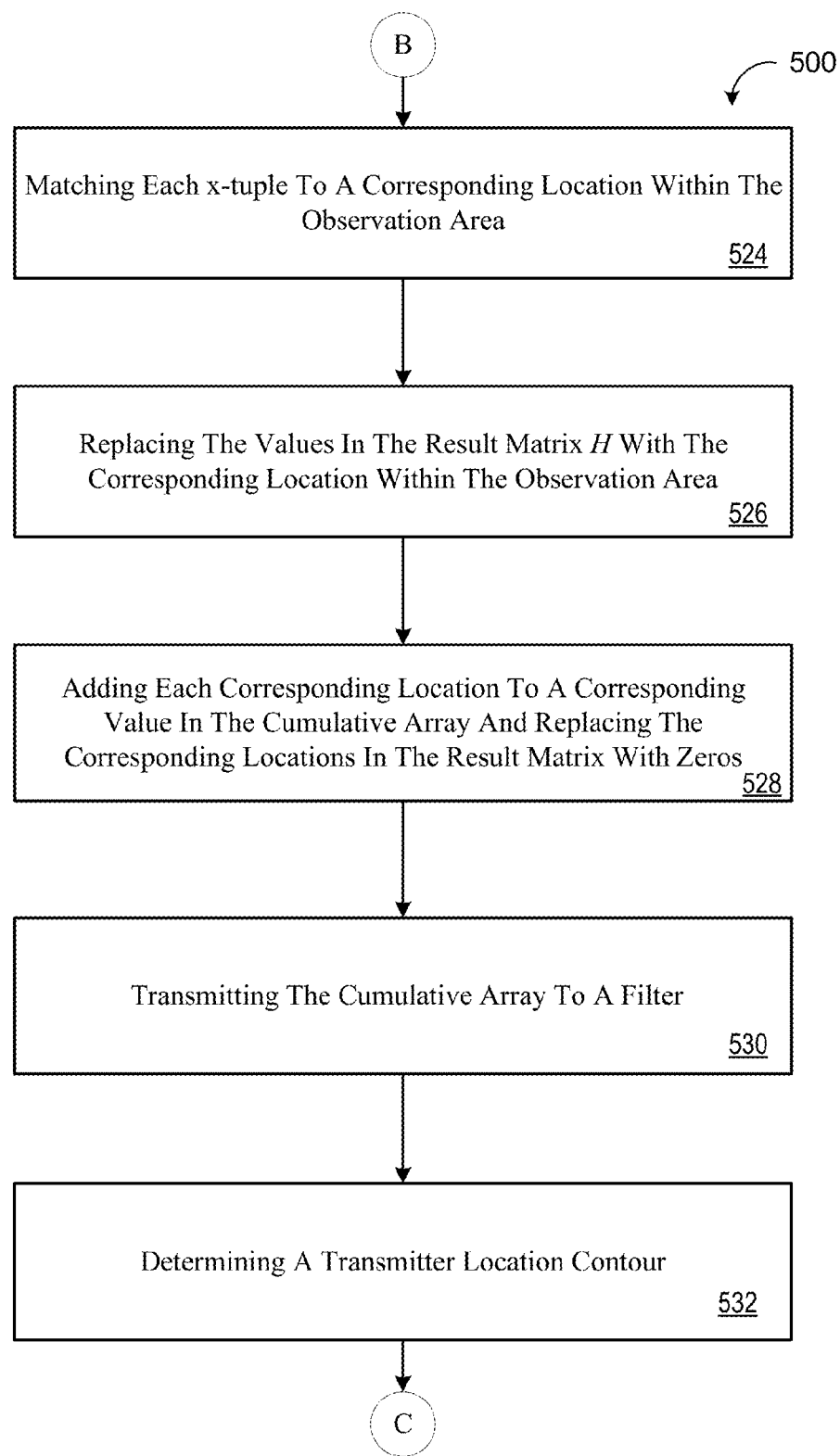
Figure 5D:
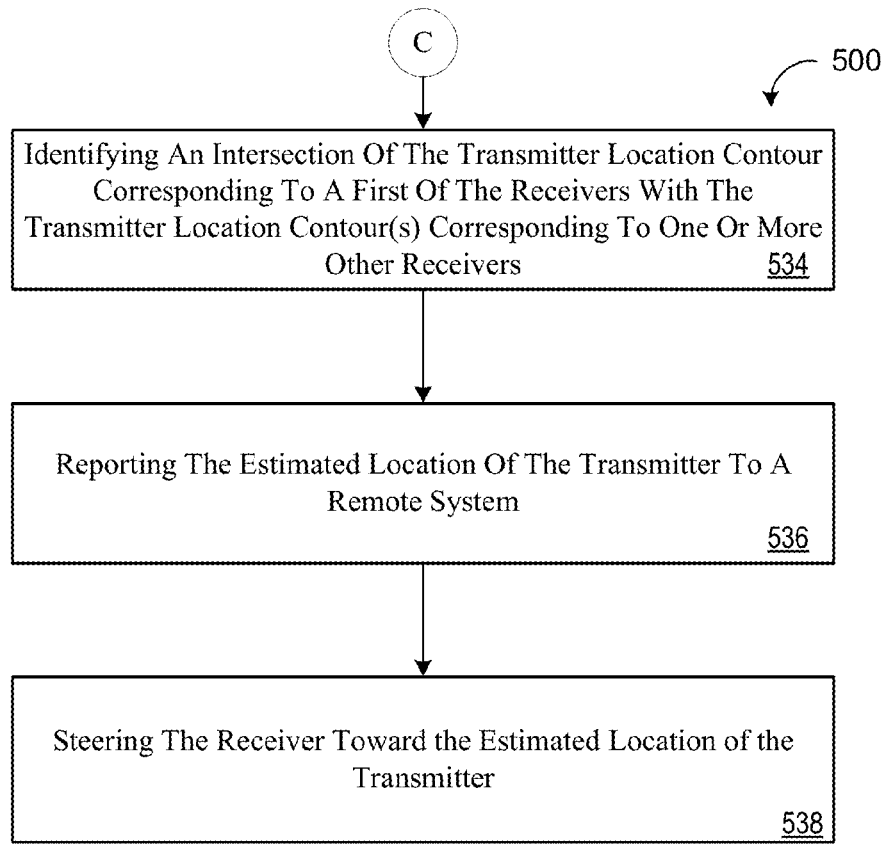

FIG. 3A illustrates a sample path loss function 300a for a receiver 110, including the receive power $R_k$ (y-axis) of the signal 104 received by a receiver 110 over a range of one-dimensional locations (x-axis) of the transmitter 102. FIG. 3B illustrates a linear approximation 300b of the sample path loss function 300a measured and illustrated in FIG. 3A. As will be explained in more detail below, the linear approximation 300b of the receive power $R_k$ can be determined by discretizing an area (e.g., the observation area 106) and repeatedly querying the propagation matrix datastore 206 through application programming interface functions. For example, as illustrated in FIG. 4, the observation area 106 may be subdivided into a grid 400 having a plurality of sections 402 of uniform or varying size.

In order to determine the actual or estimated location of the transmitter 102 from a set of more than one candidate location, the device manager 150 may steer the antenna(s) 112 for one or more of the receivers 110, 110n toward, or otherwise point the antenna(s) 112 in the direction of, the candidate locations.

As the signal 104 propagates from the transmitter 102 to the receiver 110, the power of the signal 104 may be reduced, such that the transmit power P of the signal 104 upon transmission from the transmitter 102 is greater than the receive power R of the signal 104 upon reception by the receiver 110. For example, a difference g(x) (e.g., a propagation loss) between the transmitted power P and the received power R of the signal 104 may be expressed as:

$$g(x) \cong P - R \quad (6)$$

For a given receiver 110, the expected difference g(x) between the transmit power P of the signal 104 upon transmission from the transmitter 102 and the receive power R of the signal 104 upon reception by the receiver 110 can be determined for various locations x of the transmitter 102. As previously discussed, the antenna 112 may be a steerable antenna having a two-dimensional reception pattern. Accordingly the propagation loss function g(x) may also be referred to as g(x, γ).

The propagation loss function g(x) may be a non-linear function estimated by transmitting known transmit powers P from transmitters 102, 102n placed at known locations within the observation area 106, and measuring the receive power R at receivers 110, 110n placed at known locations within the observation area 106.

FIG. 5 illustrates an example method 500 of determining or estimating the location of a transmitter 102 located at an unknown location within the observation area 106. At operation 502, the method includes subdividing or discretizing the observation area 106 into a plurality of regions (e.g., sections 402). The plurality of regions may collectively define a grid (e.g., grid 400) of locations $x_1$-$x_n$, as illustrated in FIG. 4. For example, at operation 502, the grid generator 210 may create the grid 400 having the plurality of regions 402.

At operation 504, for each receiver 110 in the observation area 106, the method 500 includes transmitting a location z of the receiver 110 and one or more locations x of the transmitter 102, corresponding to one of the locations $x_1$-$x_n$ within the grid 400, to the propagation matrix builder 212 to a build a propagation matrix for the receiver 110.

At operation 506, the method 500 may determine whether the number of locations x of the transmitter transmitted at 504 is greater than or equal to a predetermined number of locations N. For example, at operation 506, the method 500 may determine whether the number of locations x of the transmitter transmitted at operation 504 is greater than or equal to the number of locations $x_1$-$x_n$ within the grid 400. If operation 506 is false, the method 500 may proceed to operation 508 and increment the location $x_j$ of the transmitter 102 to a new location $x_{j+1}$. If operation 506 is true, the method 500 may proceed to operation 510 and communicate the propagation matrix, including the location z of the receiver 110 and the one or more locations x of the transmitter 102, to the propagation matrix datastore 206.

At operation 512, the method 500 may include determining the propagation loss g(x) for each receiver 110 corresponding to each location x of the plurality of locations $x_1$-$x_n$ of the transmitter 102. For example, at operation 512, for each location x of the locations $x_1$-$x_n$ of the transmitter 102, the signal locator (e.g., the propagation matrix builder 212) may determine the expected difference between the transmit power P corresponding to the transmitter 102 disposed at the location x and the receive power R received by a receiver 110 disposed at the location z.

At operation 514, the method 500 may include populating or otherwise building a propagation loss matrix A for each receiver 110 with the propagation losses g(x) determined at operation 512. For example, at operation 514, the propagation matrix builder 212 may populate the matrix A with each of the propagation losses g(x) determined at operation 512. In this regard, for a given receiver k, where $g_k(x)$ denotes the propagation loss from the location of receiver k to a target location x of the transmitter 102, the $k^{th}$ row of the propagation loss matrix A for each receiver 110, 110n may be expressed as:

$$A_k = g_k = [g_k(x_1) g_k(x_2) \ldots g_k(x_n)] \quad (7)$$

At operation 516, the method may include creating an ordered propagation loss matrix Â from the propagation loss matrix A. For example, at operation 516, for each receiver 110, 110n, the propagation matrix builder 212 may arrange the values within each row of the propagation loss matrix A from the smallest of the power differences g(x) to the largest of the propagation losses g(x) to create the ordered propagation loss matrix Â. In some implementations, the propagation matrix builder 212 arranges the values of the propagation losses g(x) for each receiver 110, 110n such that the smallest of the power differences g(x) is in a first position of a given row in the ordered propagation loss matrix Â and the largest of the power differences g(x) is in a last position of a given row in the ordered propagation loss matrix Â. In particular, the $k^{th}$ row of the ordered propagation loss matrix Â, corresponding to receiver k, may be expressed as:

$$\hat{A}_k = \hat{g}_k = [g_k(\hat{x}_1) g_k(\hat{x}_2) \ldots g_k(\hat{x}_n)] \quad (8)$$

where the correspondence between each $\hat{x}_j$—tuple and each physical location $x_j$ is governed by the following relationship:

$$g_k(\hat{x}_1) \leq g_k(\hat{x}_2) \leq \ldots \leq g_k(\hat{x}_n). \quad (9)$$

such that moving from a given loss function $g_k(\hat{x}_j)$ to a loss function $g_k(\hat{x}_{j+1})$ that follows the given loss function requires incrementing the index n.

At operation 518, the method 500 may include solving the ordered propagation loss matrix Â for the location x of a transmitter (e.g., rogue transmitter 102b). For example, at operation 518, the transmitter location solver 202 may traverse the propagation loss matrix Â to determine or at least estimate the location x of a rogue transmitter 102b. In some implementations, given a set of receivers $110_{(1)}$ to $110_{(m)}$, operation 518 includes selecting a value for a power variable p and an initial set of locations $\hat{x}_j^{(1)}, \ldots, \hat{x}_j^{(m)}$ in the ordered propagation loss matrix Â corresponding to the selected (e.g., a target or guess) power variable p.

At operation 520, the method 500 includes incrementing the initial set of locations $\hat{x}_j^{(1)}, \ldots, \hat{x}_j^{(m)}$ to the next set of locations $\hat{x}_{j+1}^{(1)}, \ldots, \hat{x}_{j+1}^{(m)}$ and repeating operation 518. For example, at operation 520, the transmitter location solver 202 may increment the initial set of locations $\hat{x}_j^{(1)}, \ldots, \hat{x}_j^{(m)}$ to the next set of locations $\hat{x}_{j+1}^{(1)}, \ldots, \hat{x}_{j+1}^{(m)}$ and repeat operation 518. The method 500 may include repeating operation 520 for a predetermined number i of steps in order to determine the corresponding $\hat{x}_n$-tuple. In particular, at operation 520, given a quantity m of receivers 110, 110a-n and a quantity r of target power levels $P_T$, where $P_T^{(1)} < \ldots < P_T^{(r)}$, the method 500 may include choosing a value of the power variable p equal to $P_T^{(r)}$ and utilizing the following relationship to determine the corresponding starting $\hat{x}_n$-tuple:

$$p - R_1 - \epsilon \leq g_1(\hat{x}_j^{(1)})$$
$$\vdots$$
$$p - R_m - \epsilon \leq g_m(\hat{x}_j^{m}) \quad (10)$$

where ε is an uncertainty value. As will be explained in more detail below, when the difference between the chosen power variable p and the receive power R is greater than a predetermined threshold Δ, then as the $\hat{x}_n$-tuple advances, the actual location x of each transmitter 102, 102n will be traversed, which will produce a peak in a result vector.

At operation 522, the method 500 includes creating a result matrix H and cumulative array v of zeros. For example, at operation 522, the transmitter location solver 202 may create the result matrix H and cumulative array v, and set the values in the result matrix H and the cumulative array v equal to zero.

At operation 524, for a plurality of steps k that may be equal to the number of locations in the ordered propagation loss matrix Â, the method 500 may include matching each $\hat{x}_n$-tuple to a corresponding location x within the observation area 106. In this regard, at operation 524, the transmitter location solver 202 may match each value $\hat{x}_n$-tuple to a corresponding location x within the observation area 106 to determine a transmitter location contour 600 (FIGS. 6A and 6B) about the corresponding receiver 110.

At operation 526, the method 500 includes replacing the values in the result matrix H with the corresponding location x. For example, at operation 526, the transmitter location solver 102 may replace the values (e.g., zeros) in the result matrix H with the corresponding location x.

At operation 528, the method 500 includes adding each value (e.g., corresponding location x) in a row of the result matrix H to a corresponding value in the cumulative array v and replacing the values (e.g., corresponding location x) in the result matrix H with zeros. Upon completion of operation 528, the method 500 may return to operation 524 and repeat operations 524, 526, and 528 a predetermined number of times. For example, the method 500 may repeat operations 524, 526, and 528 a number of times equal to number of values $\hat{x}_n$-tuple in the ordered propagation loss matrix Â.

At operation 530, the method 500 includes transmitting the cumulative array v to a filter. For example, at operation 530, the transmitter location solver 202 may transmit the cumulative array v to a nonlinear moving filter, such as the SAS 162, in order to accentuate regions (e.g., regions 402) within the observation area 106 having a high power level (e.g., receive power R). Relative to a result matrix H having q rows and q columns, the SAS 162 may compute the actual location x of the transmitter 102 using the following expression:

$$\Psi(r, s) = \sum_{j=-\frac{(q-1)}{2}}^{\frac{(q-1)}{2}} \sum_{k=-\frac{(q-1)}{2}}^{\frac{(q-1)}{2}} v(r+j, s+k)^u \quad (11)$$

where u>1 is a positive power (e.g., u=3).

At operation 532, the method 500 includes determining, for each receiver 110, a transmitter location contour 600. For example, at operation 532, the transmitter location solver 202 may create, for each receiver 110, a plot of filtered locations x determined at operation 530. The transmitter location contour 600 may represent the candidate (e.g., possible) locations of the transmitter 102 relative to the corresponding receiver 110. In this regard, for a particular receiver 110, the transmitter location contour 600 may represent a constant value receive power R, and a corresponding constant value propagation loss function g(x), at any location along the transmitter location contour 600.

Referring to FIG. 6A, in some implementations, a transmitter location contour 600a defines a generally circular shape defined by the candidate (e.g., possible) locations of the transmitter 102. For example, if there are no, or very few, terrain obstacles (e.g., trees, buildings, etc.) disposed in an area (e.g., free space) surrounding the receiver 110, the transmitter location contour 600a may define a circular shape.

Figure 6B:
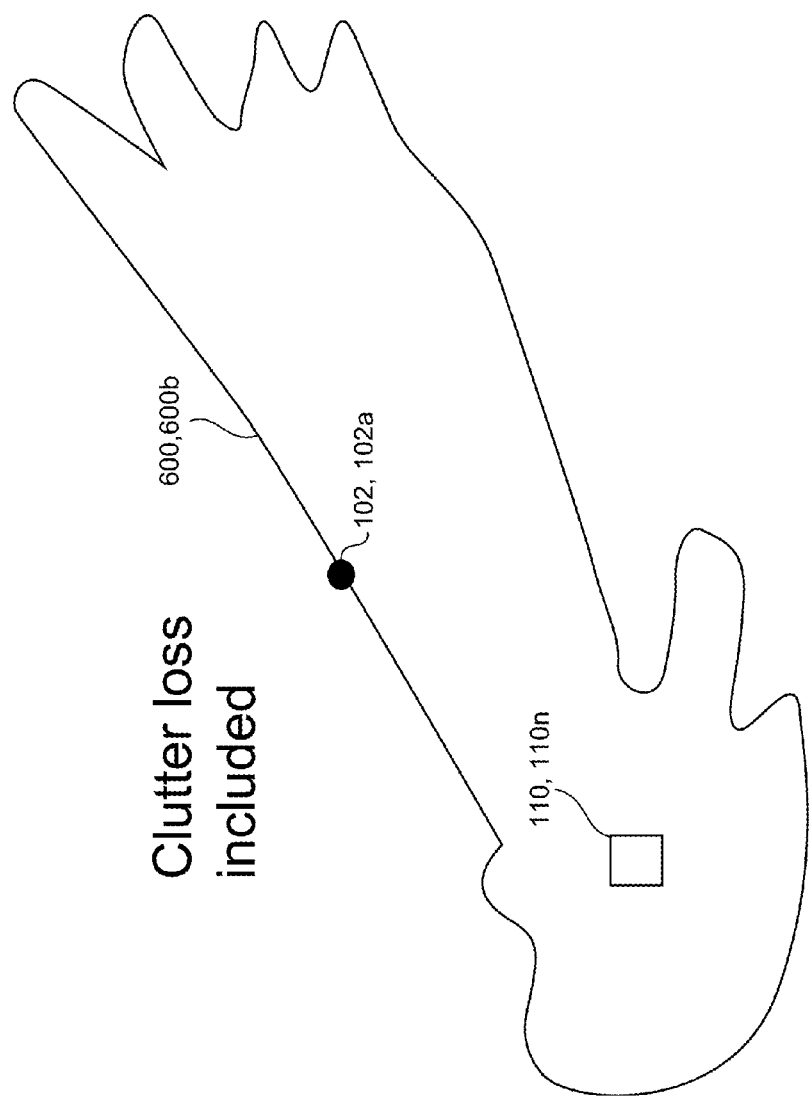
FIG. 6B is a schematic view of an example transmitter location contour of a transmitter enforcement system.

Referring to FIG. 6B, in some implementations, an example transmitter location contour 600b defines a random, or otherwise non-geometric, shape defined by the candidate (e.g., possible) locations of the transmitter 102. For example, if various terrain obstacles (e.g., trees, buildings, etc.) are disposed in an area surrounding the receiver 110, the transmitter location contour 600b may define a random shape.

Referring again to FIGS. 5A-5D, at operation 534, the method 500 includes identifying an intersection of (i) the transmitter location contour 600 corresponding to a first receiver 110a and (ii) the transmitter location contour(s) 600 corresponding to one or more other receivers 110, 110n. In this regard, at operation 534, the transmitter location solver 202 may plot each of the transmitter location contours 600a-n on a transmitter location contour plot 700, as illustrated in FIG. 7 and identify intersections 702a-n of each transmitter location contour 600 relative to the others of the transmitter location contours 600a-n. For example, the transmitter location solver 202 may identify the intersections 702a-n of a plurality of the transmitter location contours 600a-n. One or more of the intersections 702a-n may correspond to an estimated location of a corresponding one or more of the transmitter(s) (e.g., rogue transmitter 102b). In some implementations, the locations of the transmitter(s) 102 are defined by the location(s) at which the largest number of the transmitter location contours 600a-n form intersections 702a-n. In this regard, as the number i of incremental steps completed at 520 in the method 500 increases, the thickness of the transmitter location contour may increase. If the number i of incremental steps completed at 520 increases beyond a threshold, the transmitter location contours 600a-n may form intersections 702a-n that do not define locations of the transmitter(s) 102. Accordingly, the number i of incremental steps completed at 520 may be set at a value (e.g., 2000-4000) that ensures the accuracy of the estimated transmitter locations, without identifying false locations of the transmitter(s) 102.

At operation 536, the method 500 includes reporting the estimated location of the transmitter (e.g., rogue transmitter 102b) to a remote system. For example, at operation 536, the transmitter location solver 202 may report the estimated location of the transmitter to the enforcement service 170 so that the enforcement service 170 can remove the transmitter 102b and the signals 104 generated thereby from the observation area 106.

At operation 538, the method 500 may include steering a portion (e.g., antenna 112) of the receiver 110 toward the estimated location of the transmitter 102. For example, using beam forming, at operation 538, the device manager 150 may steer the antenna 112 toward the estimated location of the transmitter 102 in order to verify the location of the rogue transmitter 102 and to estimate the transmit power P of the transmitter.

Once a particular transmitter 102 has been identified and located at operation 538, the influence of that particular transmitter 102 on the method 500 may be removed prior to locating other transmitters 102 with the method 500. In some implementations, the influence of the particular transmitter 102 is removed by utilizing the outputs of the method 500 (e.g., the location of the particular transmitter 102 and the transmit power P of the particular transmitter 102), in conjunction with the information about the terrain in the observation area 106, to model the effect of the signal (e.g., signal 104) produced by the particular transmitter 102, and remove (e.g., subtract) the transmit power P from the receive power R measured by each of the receivers 110. In other implementations, the influence of the particular transmitter 102 is removed by adjusting the direction in which the antenna 112 points. For example, the device manager 150 may steer the antenna 112 away from the particular transmitter 102 such that the signal 104 produced by the particular transmitter 102 is not received by the receivers 110.

Figure 8A:
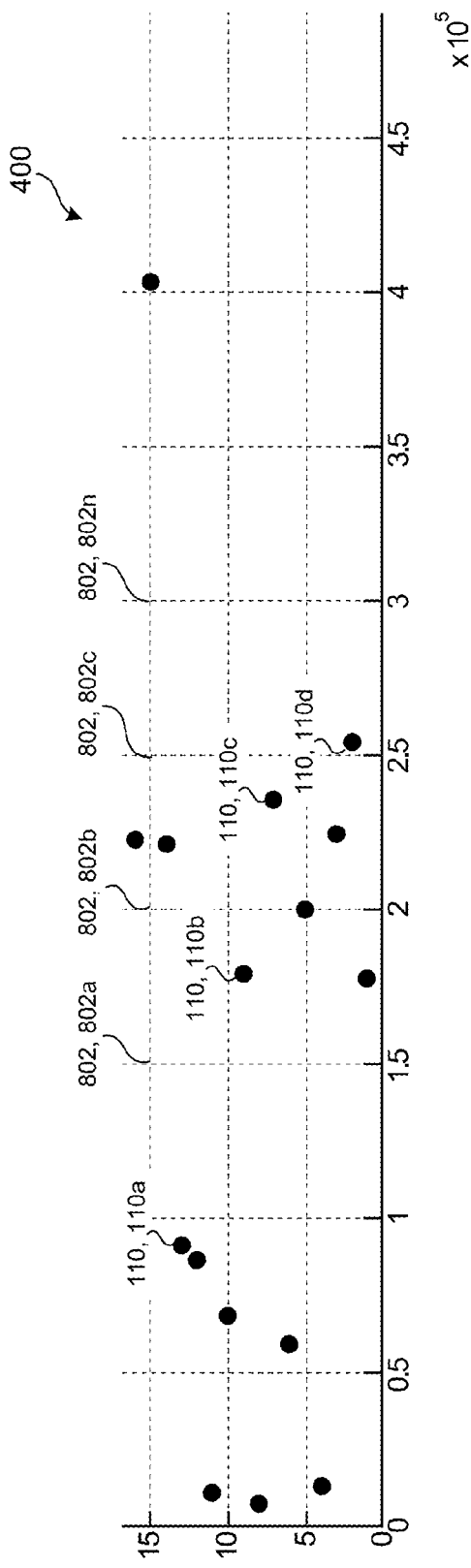
FIG. 8A is a schematic view of a portion of an example path traversed in a ordered propagation loss matrix of a transmitter enforcement system.
Figure 8B:
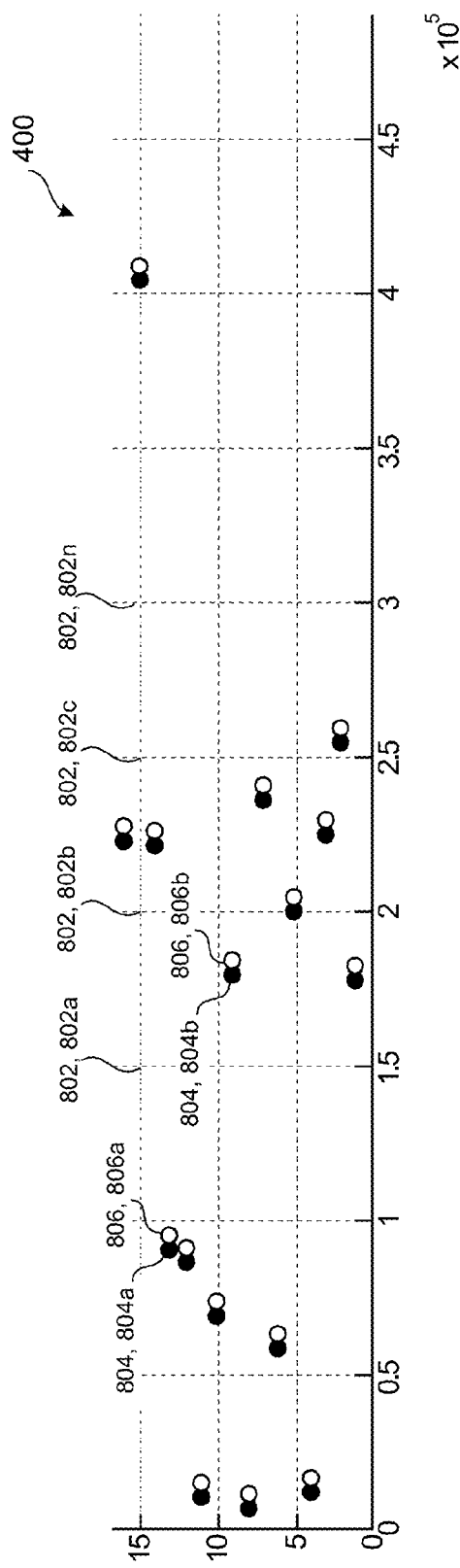
FIG. 8B is a schematic view of a portion of an example path traversed in a ordered propagation loss matrix of a transmitter enforcement system.
Figure 8C:
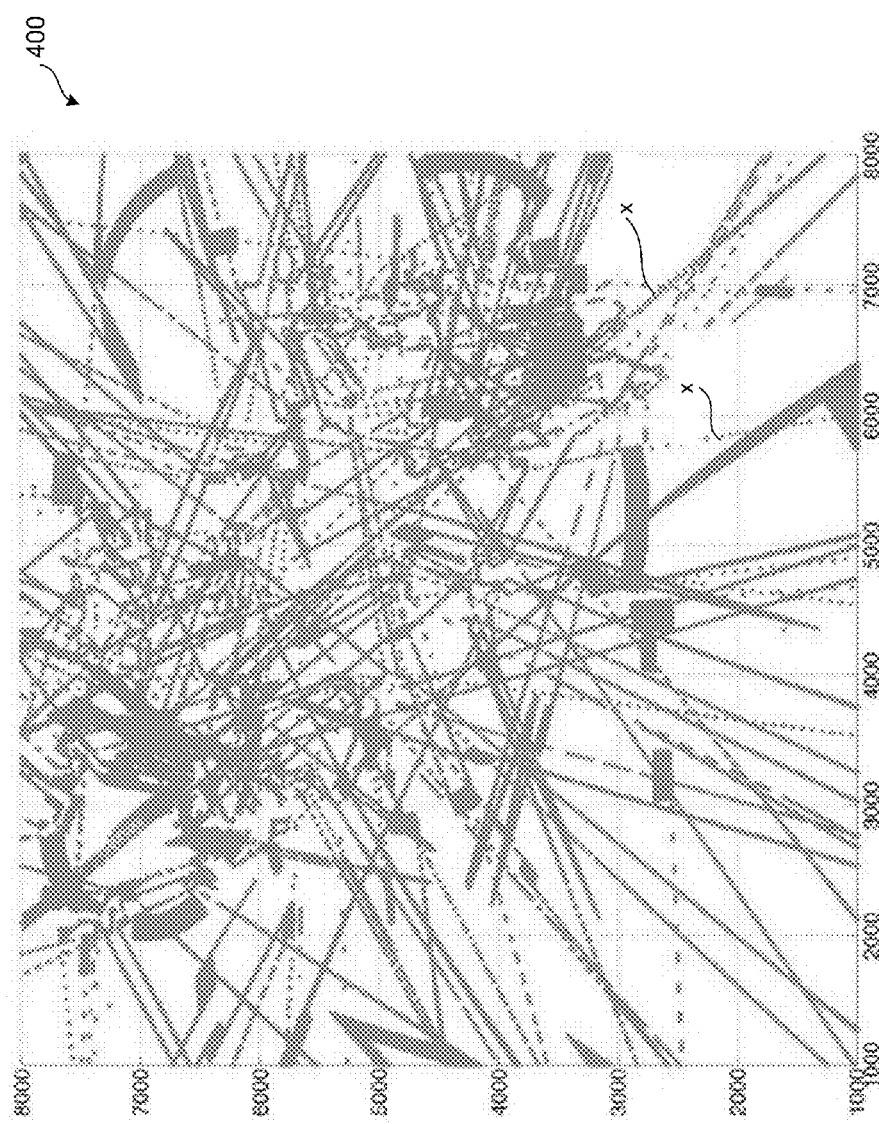
FIG. 8C is a schematic view of actual physical locations visited while traversing an example ordered propagation loss matrix of a transmitter enforcement system.
Figure 9:
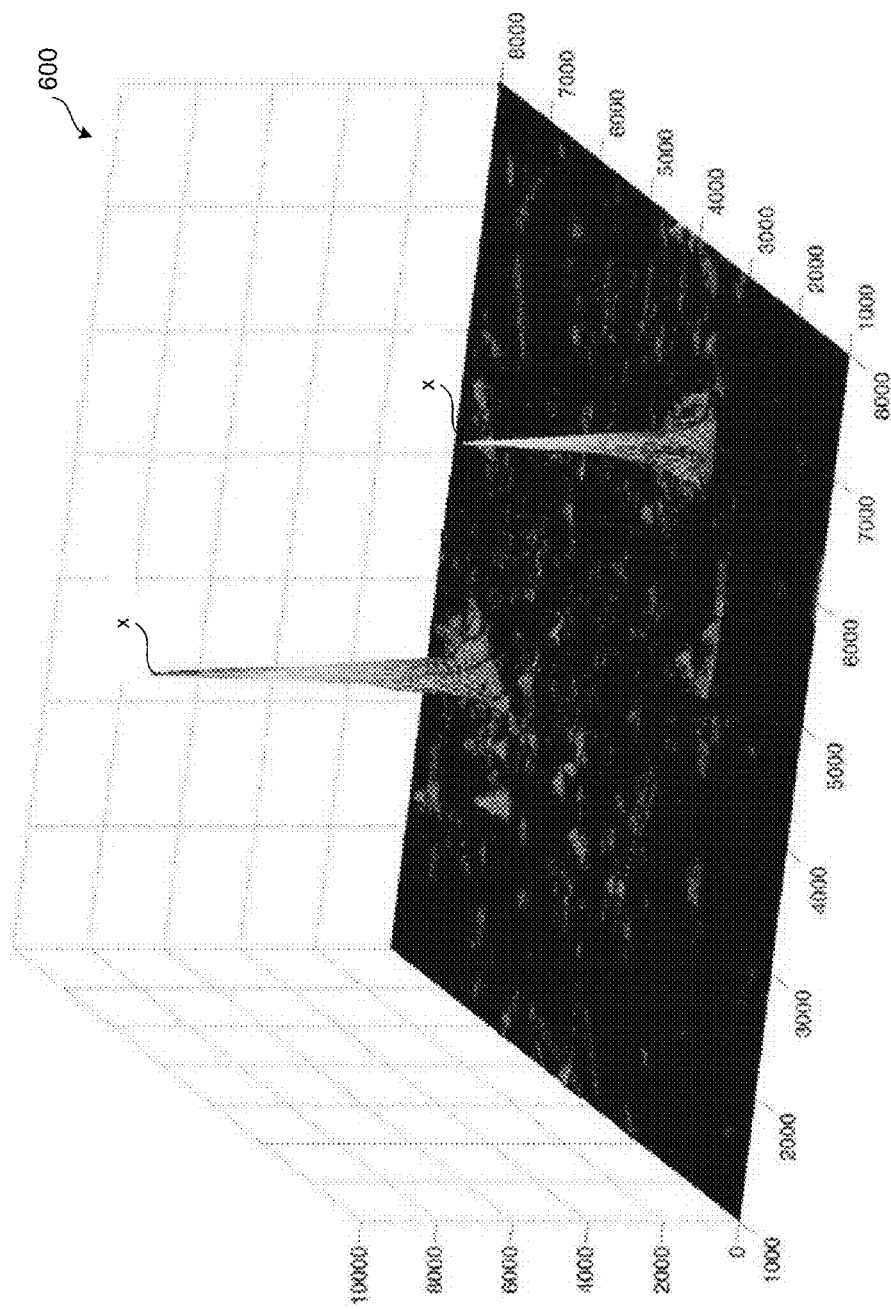
FIG. 9 is a schematic view of example estimated locations of first and second transmitters of a transmitter enforcement system.

An example implementation of the method 500 implemented by a transmitter enforcement system 100 (e.g., transmitter enforcement system 100) having sixteen receivers 110, 110n, two transmitters 102, 102n, will now be described in more detail. As illustrated in FIG. 8A, the receivers 110, 110n may be disposed within a grid (e.g., grid 400) having a plurality of grid points 802, 802n. In the implementation illustrated in FIG. 6A, each grid point 802 may be separated from an adjacent grid point 802 by a distance of ten meters, and the transmit power P of each transmitter 102 may be set to 40 dBm. As described above, the value of the power variable p may be set to 40 dBm, and locations $\hat{x}_1$ to $\hat{x}_i$ may be advanced through the predetermined number i of steps (e.g., operations 518 and/or 520) in order to determine the corresponding $\hat{x}_n$-tuple. FIG. 8B illustrates the $\hat{x}_n$-tuples for the starting points 804, 804a-n and ending points 806, 806a-n for each receiver 110. FIG. 8C illustrates actual physical locations visited, for example at operation 520, while traversing an ordered propagation loss matrix of the transmitter enforcement system 100. In particular, FIG. 8C illustrates the plotted candidate locations x of each of the two transmitters 102, 102n corresponding to the entire set of $\hat{x}_n$-tuples. FIG. 9 illustrates the actual or estimated location x of each of the two transmitters 102, 102n within an observation area (e.g., observation area 106) determined after filtering the plotted candidate locations (e.g., operation 530).

When the difference between the chosen power variable p and the transmit power level P is greater than a predetermined threshold Δ, each sorted tuple element $\hat{x}_n^{(j)}$ may randomly map to a physical location x in a result matrix (e.g., result matrix II). When the difference between the chosen power variable p and the transmit power level P is less than the predetermined threshold Δ, then each sorted tuple element $\hat{x}_n^{(j)}$ may map to an actual physical location x of one of the transmitters 102, 102n. In this regard, as previously described, the receive power level R may be expressed as:

$$10^{(P_1-g_1(x_1)-R_1)/10} + \ldots + 10^{(P_t-g_1(x_t)-R_1)/10} = 1$$

$$\vdots$$

$$10^{(P_1-g_m(x_1)-R_m)/10} + \ldots + 10^{(P_t-g_m(x_t)-R_m)/10} = 1 \quad (12)$$

where t is the quantity of transmitters 102, 102n, and m is the quantity of receivers 110, 110n.

The magnitude of receive power R observed at a receiver 110 is a non-decreasing function of the magnitude of transmit power P of a particular transmitter 102. In this regard, the magnitude of transmit power P of a particular transmitter 102 located at x, adjusted by the corresponding propagation loss g(x) for a given receiver 110, cannot exceed the magnitude of receive level R seen at the given receiver 110. This can be expressed as:

$$P_k - g_1(x_k) \leq R_1$$

$$\vdots$$

$$P_k - g_m(x_k) \leq R_m \quad (13)$$

Accordingly, an acceptable value for the chosen power variable p complies with the following inequality:

$$p - g_j(x_k) \leq R_j \quad (14)$$

and the exponents in equation (12) will be negative, such that:

$$p - g_j(x_k) - R_j \leq 0 \quad (15)$$

Negative exponents imply a rapid reduction in the value of $10^{(p-g_j(x_k)-R_j)/10}$ (Equation (12)). Namely, as the exponent magnitude increases, $p-g_j(x_k)-R_j=-30$ dB yields $10^{(p-g_j(x_k)-R_j)/10}=0.001$.

When (i) the chosen value of the power variable p is within the predetermined threshold Δ relative to the transmit power $P_k$ of transmitter $102_k$ and (ii) the location x is within a predetermined distance of the location $x_k$ of transmitter $102_k$, the following relationship applies:

$$p - g_j(x) - R_j \cong P_k - g_j(x_k) - R_1 \quad (16)$$

where the term $P_k - g_j(x_k)$ yields what the receive power R would be if only transmitter $102_k$ were present, and may be less than the actual received level $R_j$ if other transmitters 102 are present or disposed within the observation area 106.

If the transmit power $P_k$ is high enough (e.g., if transmitter $102_k$ is a dominant transmitter), the magnitude of the term $P_k - g_j(x_k) - R_j$ may be relatively small (e.g., within the predetermined threshold Δ) compared to the magnitude of the term $P_k - g_j(x_k) - R_j$ obtained using other choices for the chosen power variable p and the location x of the transmitter $102_k$. As used herein the term "dominant transmitter" includes a transmitter 102 that greatly influences the receive power R of the receivers 110 disposed around the transmitter 102. The corresponding exponent of equation (12), therefore, may be less negative and the quantity $10^{(P_k-g_j(x_k)-R_j)/10}$ may be dominant.

As previously discussed, all valid candidate locations x for the transmitter 102 may satisfy the following inequality:

$$p - g_j(x) - R_j \leq 0 \quad (17)$$

Accordingly, once a level for the power variable p has been chosen, a starting location $\hat{y}_o$, may satisfy the equation:

$$f_j(p, \hat{y}_o) = p - g_j(\hat{y}_o) - R_j \leq 0 \quad (18)$$

where $g_j(\hat{y}) \geq 0$, regardless of the location $\hat{y}_o$. Therefore, the least negative value that $f_j(p, \hat{y}_o)$ can attain is given by $p - R_j$. If the value of the power variable p is not within the predetermined threshold Δ of the value of the receive power $R_j$, the starting location $\hat{y}_o$ may be a negative number. As the locations $\hat{y}$ advance and $g_j(\hat{y})$ increases (e.g., step 520), the value $f_j(p, \hat{y}_o)$ becomes more negative.

As previously discussed, a large negative value of $f_j(p, \hat{x})$ implies a small value for $10^{f_j(p, \hat{x})/10}$. Whereas, if the value of the chosen power variable p is close to receive power $R_j$, because it is close to the power level of a dominant transmitter 102, then $p - R_j$ is less negative, such that $10^{f_j(p, \hat{x})/10}$ is non-negligible.

If a transmitter 102 disposed at location $x_k$ is dominant, then $g_j(\hat{x}_k)$ will not be a large value so as to cause a negligible effect on receive power $R_j$. Otherwise, the effect of said transmitter 102 on receiver $110_j$ would not be significant and thus the transmitter 102 would not be dominant relative to the receiver $110_j$. On the other hand, a transmitter 102 does not have to be in the immediate vicinity of receiver $110_j$ to have an impact on the receive power $R_j$. For example, if receiver $110_j$ is largely isolated from the influence of other transmitters 102 and there is a low loss path from receiver $110_j$ to the transmitter 102 in question, the transmitter's 102 effect on the receive power $R_j$ may be significant.

Figure 10:
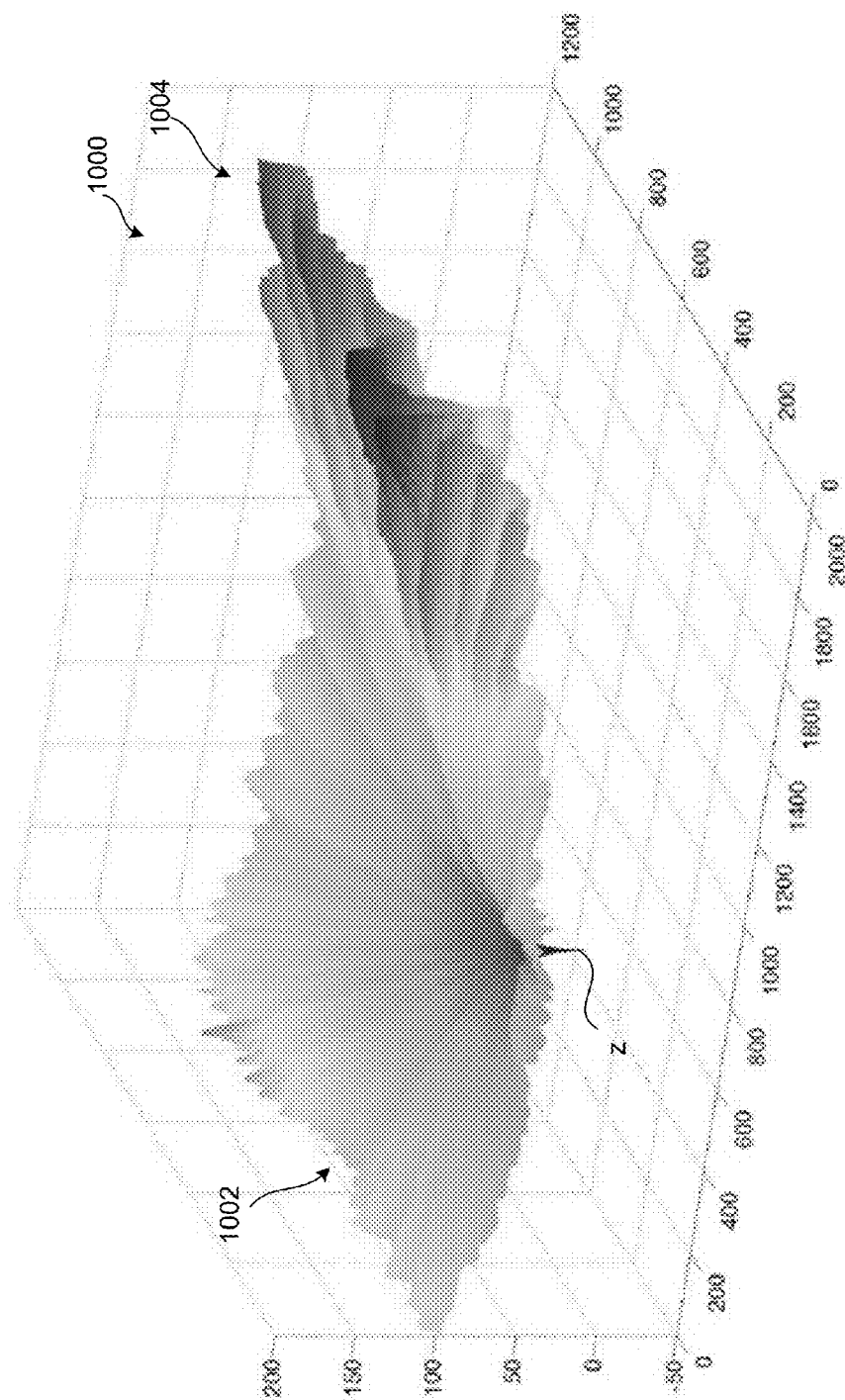
FIG. 10 is an example propagation loss function of a transmitter enforcement system.

With reference to FIG. 10, a propagation loss function 1000 (e.g., g(x)) for a receiver (e.g., receiver 110) having a location z is illustrated. The propagation loss function 1000 illustrates areas 1002 having no terrain obstacles (e.g., trees, buildings, etc.) or a small number of terrain obstacles, and areas 1004 having a large number of terrain obstacles.

Figure 11:
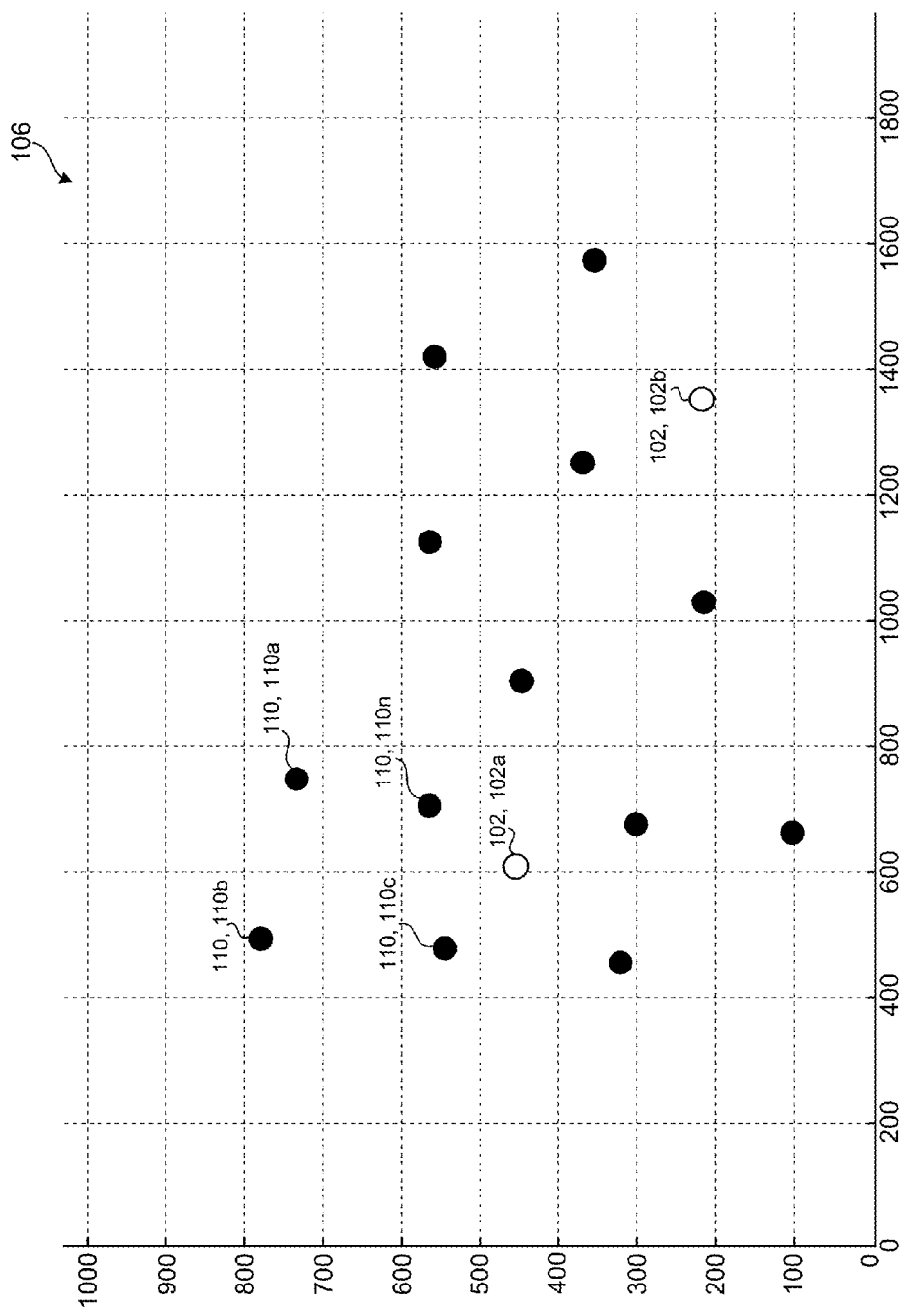
FIG. 11 is a schematic view of an example placement of transmitters and receivers within an observation area of a transmitter enforcement system.

The method 500 may estimate the location x of the dominant transmitters 102 disposed within the observation area 106. For example, with reference to the observation area 106 illustrated in FIG. 11, the method 500 may estimate the location of dominant transmitters 102a and 102b using receivers 110a-n.

Another example method of determining or estimating with the transmitter enforcement system 100 the location of a transmitter 102 located at an unknown location within the observation area 106 may include subdividing or discretizing the observation area 106 into a plurality of regions (e.g., sections 402) defining a grid (e.g., grid 400) of locations $x_1$-$x_n$, as illustrated in FIG. 4. The method may also include creating a piecewise linear approximation of propagation loss g(x), in Watts, for each receiver 110 using known propagation loss values at various locations (e.g., section 402) in the grid 400. In this regard, the piecewise interpolation formula $\hat{L}_k(y)$ for the propagation loss function g(x) for a receiver $110_k$, relative to a transmitter 102 disposed at a location y, can expressed as:

$$\hat{L}_k(\hat{y}) = 10^{-L_k(y)/10} \approx \Sigma_{j=1}^n g_k(x_j) w_j = g_k^T w \quad (19)$$

where:

$$y = \Sigma_{j=1}^n x_j w_j = x^T w \quad (20)$$

For each receiver 110 in the observation area 106, a location z of the receiver $110_k$ and one or more locations y of the transmitter 102, corresponding to one of the locations $x_1$-$x_n$ within the grid 400, are transmitted to the propagation matrix builder 212 to a build a propagation vector $g_k$ for the receiver $110_k$.

When S transmitters 102 and N receivers 110 are present in the observation area 106, the propagation loss function g(x) for the receiver $110_k$ can expressed as:

$$10^{P_1/10} \cdot 10^{-L_1(x_1)/10} + \ldots + 10^{P_s/10} \cdot 10^{-L_1(x_s)/10} = 10^{R_1/10}$$

.
.
.

$$10^{P_1/10} \cdot 10^{-L_n(x_1)/10} + \ldots + 10^{P_s/10} \cdot 10^{-L_n(x_s)/10} = 10^{R_N/10} \quad (21)$$

When $\hat{P}_k = 10^{P_k/10}$ and $\hat{R}_k = 10^{R_k/10}$, the equation (21) can be expressed as:

$$\hat{P}_1 \hat{L}_1(x_1) + \ldots + \hat{P}_s \hat{L}_1(x_s) = \hat{R}_1$$

.
.
.

$$\hat{P}_1 \hat{L}_N(x_1) + \ldots + \hat{P}_s \hat{L}_N(x_s) = \hat{R}_N \quad (22)$$

Using the piecewise linear approximation expressed at equations (19) and (20), the equation (22) becomes:

$$\hat{P}_1 g_1^T w^{(1)} + \ldots + \hat{P}_s g_1^T w^{(s)} = \hat{R}_1$$

.
.
.

$$\hat{P}_1 g_N^T w^{(1)} + \ldots + \hat{P}_s g_N^T w^{(s)} = \hat{R}_N \quad (23)$$

where there are S weight vectors $w^{(1)}, \ldots, w^{(s)}$, each associated with a particular transmitter 102.

Equation (23) can be expressed in the form of a matrix as:

$$Ay = b \quad (24)$$

where:

$$A_j = g_j^T \quad (25)$$

$$y = \hat{P}_1 w^{(1)} + \ldots + \hat{P}_s w^{(s)} \quad (26)$$

$$b_j = \hat{R}_j \quad (27)$$

The piecewise linear approximation propagation $\hat{L}_k(y)$ of the loss function g(x) for a receiver $110_k$, relative to a transmitter 102 disposed at a location y requires, at most, four grid points, and only one grid point if the transmitter 102 lies on a grid point within the grid 400. In this regard, if the grid 400 includes a large quantity of grid points, the actual space occupied by the transmitter(s) 102 may represent a small fraction of the observation area 106. In other words, y may be a sparse vector, such that y should have a small cardinality. Since y is a scaled version of w, y and w may have the same cardinality. Accordingly, optimization can be formulated, as follows:

$$\min \|y\|_0 \quad (28)$$

$$Ay = b \quad (29)$$

Optimization can be reformulated in convex form by replacing the norm-0 with a norm-1 constraint, as follows:

$$\min \|y\|_1 \quad (30)$$

$$Ay = b \quad (31)$$

The probability of determining a correct solution for the location of the transmitter 102 can be reduced by using a reweighted version of the norm-1 and iterating and squeezing the polytope to sharpen the target corners in every iteration until the error is small enough. A diagonal matrix may be used to hold the weights. In this regard, the weight matrix $\Lambda^{(0)}$ can be set to all zeros and the diagonal elements can be set to one. The weighted norm-1 minimization program can be solved according to the following relationship:

$$y^{(k)} = \arg\min \|\Lambda^{(k)} \hat{y}\|_1 \quad (32)$$

$$A\hat{y} = b \quad (33)$$

The weights can be updated by the following relationship:

$$\Lambda_{jj}^{(k+1)} = 1/(|y_j^{(k)}| + \epsilon) \quad (34)$$

After a specified maximum number of iterations, the process may be terminated. For example, the process may be terminated upon attaining desired error level.

Figure 12:
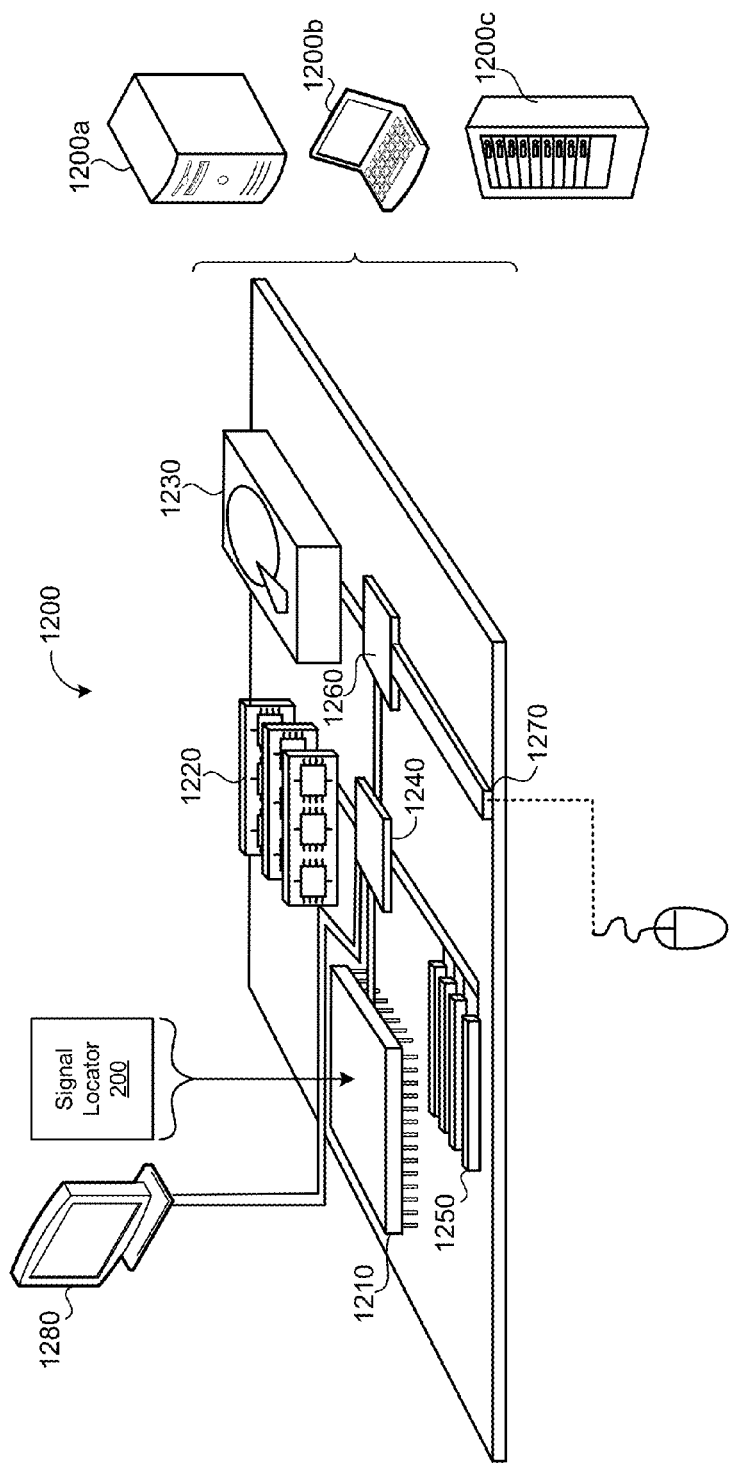
FIG. 12 is a schematic view of an example computing device executing any methods according to the principles of the present disclosure.

FIG. 12 is a schematic view of an example computing device 500 that may be used to implement the systems and methods described in this document. The computing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1200 includes a processor 1210, memory 1220, a storage device 1230, a high-speed interface/controller 1240 connecting to the memory 1220 and high-speed expansion ports 1250, and a low speed interface/controller 1260 connecting to low speed bus 1270 and storage device 1230. Each of the components 1210, 1220, 1230, 1240, 1250, and 1260, are interconnected using various busses, and may be mounted on a common motherboard or in other manners as appropriate.

The processor 1210 can process instructions for execution within the computing device 1200, including instructions stored in the memory 1220 or on the storage device 1230 to display graphical information for a graphical user interface (GUI) on an external input/output device, such as display 1280 coupled to high speed interface 1240. In this regard, the processor 1210 may process instructions for the signal locator 200 and other processes of the transmitter enforcement system 100 to execute the methods (e.g., method 500) of the present disclosure. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1220 stores information non-transitorily within the computing device 1200. The memory 1220 may be a computer-readable medium, a volatile memory unit(s), or non-volatile memory unit(s). The non-transitory memory 1220 may be physical devices used to store programs (e.g., sequences of instructions) or data (e.g., program state information) on a temporary or permanent basis for use by the computing device 1200. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1230 is capable of providing mass storage for the computing device 1200. In some implementations, the storage device 1230 is a computer-readable medium. In various different implementations, the storage device 1230 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1220, the storage device 1230, or memory on processor 1210.

The high speed controller 1240 manages bandwidth-intensive operations for the computing device 1200, while the low speed controller 1260 manages lower bandwidth-intensive operations. Such allocation of duties is exemplary only. In some implementations, the high-speed controller 1240 is coupled to the memory 1220, the display 1280 (e.g., through a graphics processor or accelerator), and to the high-speed expansion ports 1250, which may accept various expansion cards (not shown). In some implementations, the low-speed controller 1260 is coupled to the storage device 1230 and low-speed expansion port 1270. The low-speed expansion port 1270, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1200a or multiple times in a group of such servers 1200a, as a laptop computer 1200b, or as part of a rack server system 1200c.

Modules and data stores included in the transmitter enforcement system 100 may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, receiver signals from corresponding receivers located within an observation area, at least one of the receiver signals corresponding to a rogue signal transmitted from a rogue transmitter having a location in the observation area;
estimating, by the data processing hardware, the location of the rogue transmitter by:
for each receiver, determining a transmitter location contour about the receiver based on the corresponding at least one receiver signal and one or more propagation path loss functions, each propagation path loss function based on terrain information corresponding to the observation area, the transmitter location contour defining a collection of candidate locations of the rogue transmitter relative to the receiver; and
identifying an intersection of the transmitter location contours of the receivers as the estimated location of the rogue transmitter; and
reporting the estimated location of the rogue transmitter to a remote system in communication with the data processing hardware,
wherein each propagation path loss function complies with:

$$P-g(x) \leq R$$

wherein g(x) is the propagation path loss function, P is a transmit power magnitude of the rogue signal, x is a candidate location of the collection of candidate locations, and R is a receive power magnitude of the corresponding receiver signal.

2. The method of claim 1, wherein at least one transmitter location contour about the corresponding receiver is based on a receive power magnitude of the corresponding receiver signal.

3. The method of claim 1, wherein the at least one rogue signal is received by the corresponding receiver at a first time, and wherein the at least one transmitter location contour about the corresponding receiver is based on the first time.

4. The method of claim 1, wherein the at least one rogue signal is received by the corresponding receiver at an angle relative to a reference direction, and wherein the at least one transmitter location contour about the corresponding receiver is based on the angle.

5. The method of claim 1, further comprising steering the receivers toward the estimated location of the rogue transmitter using beam forming.

6. The method of claim 1, wherein the terrain information includes locations of at least one of vegetation, buildings, and ground elevations within the observation area.

7. The method of claim 1, wherein a first of the receiver signals is transmitted using a first transmission protocol, and a second of the receiver signals is transmitted using a second transmission protocol different than the first transmission protocol.

8. The method of claim 7, wherein the first transmission protocol is WiFi and the second transmission protocol is LTE.

9. The method of claim 1, wherein each transmitter location contour defines a circumscribed path along the collection of candidate transmitter locations about the receiver.

10. A method comprising:
receiving, at data processing hardware, receiver signals from corresponding receivers located within an observation area, at least one of the receiver signals corresponding to a rogue signal transmitted from a rogue transmitter having a location in the observation area;

estimating, by the data processing hardware, the location of the rogue transmitter by:
    for each receiver, determining a transmitter location contour about the receiver based on the corresponding at least one receiver signal and one or more propagation path loss functions, each propagation path loss function based on terrain information corresponding to the observation area, the transmitter location contour defining a collection of candidate locations of the rogue transmitter relative to the receiver; and
    identifying an intersection of the transmitter location contours of the receivers as the estimated location of the rogue transmitter; and
reporting the estimated location of the rogue transmitter to a remote system in communication with the data processing hardware,
wherein determining the transmitter location contour about the corresponding receiver comprises determining, for each receiver, by a transmitter location solver of the data processing hardware, a plurality of propagation loss values from the propagation loss function based on (i) a location of the receiver and (ii) a plurality of guessed locations of the rogue transmitter.

11. The method of claim 10, further comprising creating a propagation loss matrix having the plurality of propagation loss values, a first of the plurality of first propagation loss values corresponding to a first of a plurality of guessed locations of the rogue transmitter, a second of the plurality of propagation loss values corresponding a second of the plurality of guessed locations of the rogue transmitter.

12. The method of claim 11, wherein the $j^{th}$ entry of an ordered propagation loss matrix complies with:

$$\hat{A}_j = \hat{g}_j = [g_j(\hat{x}_1^{(j)}) g_j(\hat{x}_2^{(j)})]$$

wherein $g_j(\hat{x}_1^{(j)})$ is the smaller of the first and second propagation loss values.

13. A system comprising:
data processing hardware; and
memory hardware in communication with the data processing hardware, the memory hardware storing instructions that when executed on the data processing hardware cause the data processing hardware to perform operations comprising:
    receiving receiver signals from corresponding receivers located within an observation area and in communication with the data processing hardware, each receiver signal having a corresponding receive power level and corresponding to a rogue signal transmitted from a rogue transmitter located in the observation area;
    determining a location of the rogue transmitter by:
        for each receiver, determining a transmitter location contour about the receiver based on the receive power level of the corresponding receiver signal and one or more propagation path loss functions, each propagation path loss function based on terrain information corresponding to the observation area, the transmitter location contour defining a collection of candidate locations of the rogue transmitter relative to the receiver; and
        identifying an intersection of the transmitter location contours of the receivers as the estimated location of the rogue transmitter; and
    reporting the estimated location of the rogue transmitter to a remote system in communication with the data processing hardware,
    wherein each propagation path loss function complies with:

$$P - g(x) \leq R$$

wherein $g(x)$ is the propagation path loss function, P is a transmit power magnitude of the rogue signal, x is a candidate location of the collection of candidate locations, and R is a receive power magnitude of the corresponding receiver signal.

14. The system of claim 13, wherein at least one transmitter location contour about the corresponding receiver is based on a receive power magnitude of the corresponding receiver signal.

15. The system of claim 13, wherein the at least one rogue signal is received by the corresponding receiver at a first time, and wherein the at least one transmitter location contour about the corresponding receiver is based on the first time.

16. The system of claim 13, wherein the at least one rogue signal is received by the corresponding receiver at an angle relative to a reference direction, and wherein the at least one transmitter location contour about the corresponding receiver is based on the angle.

17. The system of claim 13, wherein the data processing hardware steers the receivers toward the estimated location of the rogue transmitter using beam forming.

18. The system of claim 17, wherein the terrain information includes locations of at least one of vegetation, buildings, and ground elevations within the observation area.

19. The system of claim 13, wherein a first of the receiver signals is transmitted using a first transmission protocol, and a second of the receiver signals is transmitted using a second transmission protocol different than the first transmission protocol.

20. The system of claim 19, wherein the first transmission protocol is WiFi and the second transmission protocol is LTE.

21. The system of claim 13, wherein each transmitter location contour defines a circumscribed path along the collection of candidate transmitter locations about the receiver.

22. A system comprising:
data processing hardware; and
memory hardware in communication with the data processing hardware, the memory hardware storing instructions that when executed on the data processing hardware cause the data processing hardware to perform operations comprising:
    receiving receiver signals from corresponding receivers located within an observation area and in communication with the data processing hardware, each receiver signal having a corresponding receive power level and corresponding to a rogue signal transmitted from a rogue transmitter located in the observation area;
    determining a location of the rogue transmitter by:
        for each receiver, determining a transmitter location contour about the receiver based on the receive power level of the corresponding receiver signal and one or more propagation path loss functions, each propagation path loss function based on terrain information corresponding to the observation area, the transmitter location contour defining a collection of candidate locations of the rogue transmitter relative to the receiver; and identifying an intersection of the transmitter location contours of the receivers as the estimated location of the rogue transmitter; and reporting the estimated location of the rogue transmitter to a remote system in communication with the data processing hardware, wherein the data processing hardware comprises a transmitter location solver configured to determine, for each receiver, a plurality of propagation loss values from the propagation loss function based on (i) a location of the receiver and (ii) a plurality of guessed locations of the rogue transmitter.

23. The system of claim 22, further comprising a propagation matrix builder configured to create a propagation loss matrix having the plurality of propagation loss values, a first of the plurality of first propagation loss values corresponding to a first of a plurality of guessed locations of the rogue transmitter, a second of the plurality of propagation loss values corresponding a second of the plurality of guessed locations of the rogue transmitter.

24. The system of claim 23, wherein the $j^{th}$ entry of an ordered propagation loss matrix complies with:

$$\hat{A}_j = \hat{g}_j = [g_j(\hat{x}_1^{(j)}) g_j(\hat{x}_2^{(j)})]$$

wherein $g_j(\hat{x}_1^{(j)})$ is the smaller of the first and second propagation loss values.

* * * * *